United States Patent
Mizusaki et al.

(10) Patent No.: US 9,541,797 B2
(45) Date of Patent: Jan. 10, 2017

(54) LIQUID CRYSTAL DISPLAY DEVICE AND METHOD FOR PRODUCING SAME

(75) Inventors: Masanobu Mizusaki, Osaka (JP); Youhei Nakanishi, Osaka (JP); Takeshi Noma, Osaka (JP)

(73) Assignee: UNIFIED INNOVATIVE TECHNOLOGY, LLC, Wilmington, DE (US)

( * ) Notice: Subject to any disclaimer, the term of this patent is extended or adjusted under 35 U.S.C. 154(b) by 198 days.

(21) Appl. No.: 13/636,218

(22) PCT Filed: Feb. 24, 2011

(86) PCT No.: PCT/JP2011/054182
§ 371 (c)(1),
(2), (4) Date: Sep. 20, 2012

(87) PCT Pub. No.: WO2011/118326
PCT Pub. Date: Sep. 29, 2011

(65) Prior Publication Data
US 2013/0010245 A1  Jan. 10, 2013

(30) Foreign Application Priority Data
Mar. 23, 2010 (JP) ................. 2010-066894

(51) Int. Cl.
G02F 1/1337 (2006.01)

(52) U.S. Cl.
CPC ............ G02F 1/133723 (2013.01); G02F 2001/133757 (2013.01); Y10T 428/1014 (2015.01); Y10T 428/1018 (2015.01); Y10T 428/1023 (2015.01)

(58) Field of Classification Search
CPC ............ G02F 1/133723; G02F 2001/133757; Y10T 428/1014; Y10T 428/1018; Y10T 428/1023; Y10T 428/1027
(Continued)

(56) References Cited

U.S. PATENT DOCUMENTS 6,080,832 A * 6/2000 Chen et al. ............ 528/170
6,368,681 B1 4/2002 Ogawa
(Continued)

FOREIGN PATENT DOCUMENTS

JP 6-043463 2/1994
JP 10-153783 6/1998
(Continued)

OTHER PUBLICATIONS

JPO Website Machine English Translation of JP 06-043463, Matsuda Hiroshi, Feb. 18, 1994.*
(Continued)

*Primary Examiner* — Sophie Hon
(74) *Attorney, Agent, or Firm* — Birch, Stewart, Kolasch & Birch, LLP

(57) ABSTRACT

The present invention provides a liquid crystal display device that can prevent a decrease in the VHR and image sticking on the display screen because of residual DC voltage, and also can produce favorable alignment conditions; and a production method thereof. The liquid crystal display device of the present invention includes: a pair of substrates; a liquid crystal layer that contains liquid crystal molecules and is disposed between the pair of substrates; and an alignment film that is disposed on a liquid crystal layer side of at least one of the pair of substrates, the alignment film containing a polyamic acid or a polyimide with an imidization ratio of less than 100%, the liquid crystal display device including a monomolecular film on the alignment film.

14 Claims, 6 Drawing Sheets

(58) Field of Classification Search
USPC .................................. 428/1.2; 349/123–136
See application file for complete search history.

(56) References Cited

U.S. PATENT DOCUMENTS

| | | | |
|---|---|---|---|
| 2002/0054965 A1 | 5/2002 | Ogawa | |
| 2003/0232927 A1* | 12/2003 | Gibbons et al. | ............... 525/242 |
| 2007/0026164 A1* | 2/2007 | Murata | ............. G02F 1/133703 |
| | | | 428/1.1 |
| 2011/0164213 A1 | 7/2011 | Nakanishi et al. | |

FOREIGN PATENT DOCUMENTS

| | | |
|---|---|---|
| JP | 10-338880 | 12/1998 |
| JP | 2001-100214 | 4/2001 |
| JP | 2007-279201 | 10/2007 |
| JP | 2009-069493 | 4/2009 |
| WO | 2007-279201 | 10/2007 |
| WO | WO 2007/141935 | 12/2007 |
| WO | WO 2010/026721 | 3/2010 |

OTHER PUBLICATIONS

International Search Report for PCT/JP2011/054182 mailed Mar. 22, 2011.

* cited by examiner (a)  (b)

(a)  (b)

LIQUID CRYSTAL DISPLAY DEVICE AND METHOD FOR PRODUCING SAME

This application is the U.S. national phase of International Application No. PCT/JP2011/054182 filed 24 Feb. 2011 which designated the U.S. and claims priority to JP 2010-066894 filed 23 Mar. 2010, the entire contents of each of which are hereby incorporated by reference.

TECHNICAL FIELD

The present invention relates to a liquid crystal display device and a method for producing the same. More specifically, the present invention relates to a liquid crystal display device provided with an alignment film for controlling liquid crystal molecule alignment; and a method for producing the same.

BACKGROUND ART

Liquid crystal display devices are thin and lightweight, and consume low power. For these properties, liquid crystal display devices are used in various fields. Known display modes for liquid crystal display devices include twisted nematic (TN) mode, super twisted nematic (STN) mode, vertical alignment (VA) mode, multi-domain vertical alignment (MVA) mode, and in-plane switching (IPS) mode.

Although liquid crystal display devices are excellent in various properties, they tend to have problems such as a decrease in luminance and a decrease in contrast owing to a decrease in the voltage holding ratio (VHR). Liquid crystal display devices also tend to cause image sticking (DC image sticking) of display screens owing to residual DC voltage (for example, see Patent Literature 1).

Patent Literature 2, for example, mentions a liquid crystal alignment agent containing a polymer with a polyamic acid and/or an imide structure, an epoxy group-containing compound, and a curing agent for the epoxy group-containing compound, as an approach for enabling formation of a liquid crystal alignment film for suppressing residual DC voltage while a high voltage holding ratio is maintained.

Patent Literature 3, for example, mentions a liquid crystal alignment film on which a silane-based surfactant is chemically adsorbed via a resin film (positive resist), as an approach for enabling formation of a thin, uniform alignment film.

CITATION LIST

Patent Literature

Patent Literature 1: WO 2007/141935
Patent Literature 2: JP 10-338880 A
Patent Literature 3: JP 10-153783 A

SUMMARY OF INVENTION

Technical Problem

The approach of Patent Literature 2 achieves a low reaction efficiency, and requires addition of an epoxy group-containing compound (epoxy-based additive) at a high concentration (specifically, 20 mol % of monomer units of the polymer with a polyamic acid and/or an imide structure) to the liquid crystal alignment agent. As a result, unreacted components of the epoxy-based additive remain in the alignment film to cause misalignment. This phenomenon is more likely to occur especially in the case where the alignment film is a vertical alignment film. The present inventors have made studies on the phenomenon, and have found that, as illustrated in FIG. 14, the approach of Patent Literature 2 causes crosslinking of the polyimide by the tetraglycidyl groups in the epoxy-based additive. Therefore, application of the approach to a vertical alignment film can make the pretilt angle smaller than 90°.

The approach of Patent Literature 3 includes a silane-based surfactant chemically adsorbed on a positive resist that is disposed on the inner side (liquid crystal layer side) than electrodes, and such an approach cannot be applied to a liquid crystal display device in which a positive resist is not disposed on the inner side (liquid crystal layer side) than electrodes. In the modes generally used today, such as the TN mode, MVA mode, and IPS mode, no positive resist is provided on the inner side than the electrodes.

Also, since no alignment film made of polyimide is used, formation of a chemisorption film using a silane-based surfactant is not possible without, for example, forming a color filter on a transparent electrode (ITO) and further forming a resist film on the color filter, or forming an oxide film (e.g., silicon oxide film) in the case of forming a color filter under the transparent electrode. This is because ITO does not contain —OH groups and has a low oxidization degree thereon, and therefore does not react with the silane-based coupling agent. In a common liquid crystal display device, films such as a resist film are disposed at positions closer to a substrate than an electrode. If a resist film is formed between an electrode and the liquid crystal layer as in Patent Literature 3, impurities from the resist lead to an effect of decreasing the reliability of the liquid crystal display device.

The present invention has been made in view of the above state of the art, and aims to provide a liquid crystal display device that can prevent a decrease in the VHR and image sticking on the display screen because of residual DC voltage, and also can achieve favorable alignment conditions; and a production method thereof.

Solution to Problem

The present inventors have made various studies on liquid crystal display devices that can prevent a decrease in the VHR and image sticking on the display screen because of residual DC voltage, and also can achieve favorable alignment conditions. As a result, the present inventors have focused on carboxyl groups (residual carboxyl groups) contained in an alignment film including a polyamic acid (polyimide precursor) or a polyimide with an imidization ratio of less than 100% (such an alignment film is hereafter also referred to as a polyimide-based alignment film) as illustrated in FIG. 15.

Then, the present inventors have found that increasing the imidization ratio to decrease the residual carboxyl groups improves the VHR but also increases the residual DC voltage which causes noticeable DC image sticking. Meanwhile, decreasing the imidization ratio has been found to decrease the residual DC voltage but also decrease the VHR to decrease the long-term reliability. Accordingly, long-term use of such an alignment film leads to image sticking.

The present inventors have made further studies, and have found that disposing a monomolecular film on a polyimide-based alignment film allows adsorption of the monomolecular film to the residual carboxyl groups of the polyimide-based alignment film, whereby the concentration of the residual carboxyl groups can be lowered with the imidization ratio being maintained low, i.e., a high VHR can be maintained while the residual DC voltage is reduced. Also, since the monomolecular film can be formed after formation of the polyimide-based alignment film, the alignment film can be prevented from crosslinking, and also the material of the monomolecular film can be prevented from remaining in the alignment film. As a result, favorable alignment conditions can be achieved. Furthermore, use of a polyimide-based alignment film enables to achieve the above effects in liquid crystal display devices with various display modes. Thereby, the above problem has been solved admirably, leading to completion of the present invention.

That is, one aspect of the present invention is a liquid crystal display device (hereinafter, also referred to as a first liquid crystal display device of the present invention) including: a pair of substrates; a liquid crystal layer that contains liquid crystal molecules and is disposed between the pair of substrates; and an alignment film that is disposed on a liquid crystal layer side of at least one of the pair of substrates, the alignment film containing a polyamic acid or a polyimide with an imidization ratio of less than 100%, the liquid crystal display device including a monomolecular film on the alignment film.

In this way, the first liquid crystal display device of the present invention has a polyimide-based alignment film. The imidization ratio (imidization ratio in an alignment film state) in the first liquid crystal display device of the present invention is preferably in the range of 20 to 80%, more preferably in the range of 40 to 60%, and still more preferably about 50%. Thereby, a decrease in reliability caused by a low VHR and generation of DC image sticking can be prevented more effectively.

The imidization ratio (%) in the first liquid crystal display device of the present invention can be calculated from the FT-IR spectrum of the post-baked alignment film using the following formula.

Imidization ratio (%)=[As(C—N)/As(C=C)]/[Ar(C—N)/Ar(C=C)]

Here, A(C—N) represents the absorbance for imide C—N stretching vibrations (up to 1370 cm$^{-1}$), and A(C=C) represents the absorbance for aromatic C=C stretching vibrations (–1500 cm$^{-1}$). "As" represents the absorbance of a sample of a coating film (alignment film in the present invention), and "Ar" represents the absorbance of a coating film for reference. The coating film for reference is an alignment film formed by changing the baking conditions of the sample of the coating film to 300° C. and 90 minutes, provided that the imidization ratio of the coating film for reference is 100%.

Although a monomolecular film may of course exist uniformly and densely on an alignment film, the monomolecular film is only required to be at least on the residual carboxyl groups or a structure derived from the residual carboxyl groups on the alignment film, and may not exist uniformly and densely on the alignment film.

Since the first liquid crystal display device of the present invention has a property (aligning ability) that the alignment film controls alignment of liquid crystal molecules, the monomolecular film itself may or may not have the aligning ability. In contrast, in the liquid crystal alignment film in Patent Literature 3, the silane-based surfactant itself needs to have the aligning ability. Since the alignment film in the present invention is not required to contain a resist film, it is possible to prevent a decrease in the reliability of the liquid crystal display device because of impurities coming out of the resist film.

The display mode of the first liquid crystal display device of the present invention is not particularly limited, and various modes such as TN mode, STN mode, VA mode, IPS mode, and transverse bend alignment (TBA) mode can be employed. Also, a display mode such as 4 domain reverse twisted nematic (4DRTN) mode can be employed in which the alignment direction of the liquid crystals is divided into multiple directions such that a pixel is divided into multiple domains.

As long as the first liquid crystal display device of the present invention essentially includes these components, the structure of the first liquid crystal display device of the present invention is not particularly limited by other components. For example, the first liquid crystal display device of the present invention may be provided with an electrode at positions closer to the substrate than the alignment film.

In the following, a preferable embodiment of the first liquid crystal display device of the present invention is described in detail.

The alignment film and the monomolecular film are preferably bonded by a covalent bond. Thereby, detachment of the monomolecular film can be effectively prevented.

In the case that the alignment film and the monomolecular film are bonded by a covalent bond, the monomolecular film is on a side (i.e., on the opposite side of the main chain of the polyamic acid or the polyimide) closer to the terminal than the structure (COO group) derived from the carboxyl groups of the alignment film.

The monomolecular film preferably includes a structure that is derived from a silane-based coupling agent, and the covalent bond is preferably a bond that is represented by the following formula (1) and is formed between a structure derived from a carboxyl group in the alignment film and silicon in the structure derived from the silane-based coupling agent.

[Chem. 1]

(1)

Thereby, as illustrated in FIG. 1, a monomolecular film 113 can be formed on an alignment film 20 via the covalent bond represented by formula (1). It is therefore possible to prevent carboxyl groups from remaining in the alignment film. Also, a silane-based coupling agent easily reacts with carboxyl groups, which allows effective reduction of carboxyl groups in the alignment film. Hence, the VHR, i.e., the reliability, can be effectively improved. In FIG. 1, E represents a linear alkyl group, for example.

The silane-based coupling agent is preferably a silane-based surfactant. This is because hydrophobic groups in the silane-based surfactant contribute to favorable aligning ability. Also, in the case of applying the present invention to a vertical alignment film, for example, vertical alignment of the liquid crystals can be effectively maintained. That is, formation of a monomolecular film enables to prevent narrowing of the pretilt angle.

The silane-based surfactant preferably contains a linear alkyl group represented by the following formula (2). Thereby, in the case of applying the present invention to a vertical alignment film, favorable vertical alignment can be achieved. Silane-based surfactants having a linear alkyl group represented by the following formulas (2) to (4) can be obtained comparatively easily.

$$—(CR^1_2)_n—CR^2_3 \quad (2)$$

In formula (2), $R^1$s are the same as or different from each other, each representing a hydrogen atom or a halogen atom; $R^2$s are the same as or different from each other, each representing a hydrogen atom or a halogen atom; and n represents an integer of 0 to 17.

The above formula (2) includes 2n substituents represented by $R^1$, and the substituents may be the same as or different from each other. Further, the above formula (2) includes 3 substituents represented by $R^2$, and the substituents may be the same as or different from each other. Since a larger value of n leads to a lower anchoring strength of the alignment film, n in formula (2) is preferably an integer of 0 to 11 in terms of sufficiently maintaining the aligning ability of the alignment film.

At least one of $R^1$ and $R^2$ in formula (2) is preferably a fluorine atom. Thereby, the alignment stability of liquid crystals can be improved, and also the residual DC voltage can be reduced effectively. Specific examples thereof include a $CF_3$—$(CH_2)_9$— group, a $CF_3$—$(CF_2)_7$—$(CH_2)_2$— group, and a $CF_2$—$(CF_2)_7$—$C_6H_4$— group. Here, the $CF_3$—$(CF_2)_7$—$C_6H_4$— group has a phenyl group introduced therein, and all hydrogen atoms in an alkyl group are replaced by fluorine atoms.

The silane-based surfactant preferably contains a linear alkyl group represented by the following formula (3) or (4). Thereby, a decrease in the solubility of the silane-based surfactant can be prevented, and the alignment stability of the liquid crystals can be effectively increased while the residual DC voltage is effectively reduced. In terms of sufficiently maintaining the alignment ability of the alignment film, n in the following formulas (3) and (4) is preferably an integer of 0 to 11.

$$—(CH_2)_n—CF_3 \quad (3)$$

$$—(CH_2)_{n-1}—CF_2CF_3 \quad (4)$$

In formulas (3) and (4), n represents an integer of 0 to 17.

The silane-based surfactant preferably contains a group represented by the following formula (5). Thereby, in the case of applying the present invention to a horizontal alignment film, favorable horizontal aligning ability can be achieved. Silane-based surfactants having a group represented by the following formula (5) can be obtained comparatively easily. In terms of sufficiently maintaining the alignment ability of the alignment film, n in the following formula (5) is preferably an integer of 0 to 11.

$$—(CH_2)_n—NH_2 \quad (5)$$

In formula (5), n represents an integer of 0 to 17.

The silane-based surfactant preferably contains a $SiCl_3$ group. This is because such a silane-based surfactant more easily reacts with the residual carboxyl groups.

A pretilt angle θ of the liquid crystal molecules may satisfy $0°<θ≤8°$. Thereby, the concept of the first liquid crystal display device of the present invention can be suitably applied to a horizontal alignment liquid crystal display device.

A pretilt angle θ of the liquid crystal molecules may satisfy $89°<θ≤90°$. Thereby, the concept of the first liquid crystal display device of the present invention can be suitably applied to a vertical alignment liquid crystal display device.

A pretilt angle θ of the liquid crystal molecules may satisfy $81°<θ≤89°$. Thereby, the concept of the first liquid crystal display device of the present invention can be suitably applied to a vertical photo-alignment liquid crystal display device.

The polyamic acid or the polyimide may contain a photo-reactive functional group. Thereby, the concept of the first liquid crystal display device of the present invention can be suitably applied to a photo-alignment liquid crystal display device.

It is preferable that the polyamic acid or the polyimide includes a first monomer unit with a side chain and a second monomer unit with a side chain, the side chain of the first monomer unit includes a photo-reactive functional group, and the side chain of the second monomer unit does not include a photo-reactive functional group. Thereby, the composition ratio between the first and second monomer units can be adjusted to enable optimization of the pretilt angle under the photo-alignment treatment in a wide range.

The photo-reactive functional group is preferably at least one selected from the group consisting of a cinnamate group, a chalcone group, a tolan group, a coumarin group, and an azobenzene group. Thereby, alignment division can be performed easily. Also, since these photo-reactive functional groups are excellent in the controllability of the pretilt angle, the display qualities can be improved regarding the 4DRTN mode.

The liquid crystal display device preferably includes multiple pixels each preferably provided with two or more domains (regions with liquid crystal molecules aligned in different alignment directions from each other). Thereby, excellent viewing angle characteristics, i.e., a wide viewing angle, can be obtained.

The number of the domains is preferably four. Thereby, viewing angle characteristics from four directions, i.e., a sufficiently wide viewing angle, can be obtained.

Another aspect of the present invention is a liquid crystal display device (hereinafter, also referred to as a second liquid crystal display device of the present invention) including: a pair of substrates; a liquid crystal layer that contains liquid crystal molecules and is disposed between the pair of substrates; and an alignment film that is disposed on a liquid crystal layer side of at least one of the pair of substrates, the alignment film formed by a method that includes a step of applying, to at least one of the pair of substrates, a liquid crystal alignment agent that contains a polyamic acid or a polyimide with an imidization ratio of less than 100%, the alignment film treated by a method that includes a step of bringing a solution, containing a silane-based coupling agent adsorbable on the alignment film, into contact with the alignment film.

Thereby, a silane-based coupling agent can be adsorbed on the residual carboxyl groups of the alignment film, and thus the concentration of the residual carboxyl groups can be decreased with the imidization ratio being maintained at a low value. That is, a high VHR can be maintained with the residual DC voltage being reduced. Since the silane-based coupling agent can be adsorbed on the produced alignment film, the alignment film can be prevented from crosslinking and the silane-based coupling agent can be prevented from remaining in the alignment film. As a result, favorable alignment conditions can be achieved. Furthermore, use of a polyimide-based alignment film enables to achieve the above effects in liquid crystal display devices with various display modes.

The imidization ratio (the imidization ratio in the liquid crystal alignment agent) in the second liquid crystal display device of the present invention is preferably set such that the imidization ratio in the final alignment film state is 20 to 80% (more preferably 40 to 60%, still more preferably about 50%). Thereby, a decrease in the reliability caused by a low VHR and generation of DC image sticking can be prevented more effectively.

The imidization ratio (%) in the second liquid crystal display device of the present invention can be calculated from the 1H-NMR spectrum of the solution containing polyimide. More specifically, the peaks near 9 to 11 ppm are taken as peaks ascribed to the polyamic acid, and the peaks near 7 to 9 ppm are taken as peaks ascribed to the polyimide. From the ratio between the peak areas (integral values), the imidization ratio can be calculated.

Since the second liquid crystal display device of the present invention has a property (aligning ability) that the alignment film controls alignment of liquid crystal molecules, the silane-based coupling agent itself may or may not have the aligning ability. In contrast, in the liquid crystal alignment film in Patent Literature 3, the silane-based surfactant itself needs to have the aligning ability. Since the alignment film in the present invention is not required to contain a resist film, it is possible to prevent a decrease in the reliability of the liquid crystal display device because of impurities coming out of the resist film.

The display mode of the second liquid crystal display device of the present invention is not particularly limited, and various modes such as TN mode, STN mode, VA mode, and IPS mode can be employed. Also, a display mode such as 4DRTN mode can be employed in which the alignment direction of the liquid crystals is divided into multiple directions such that a pixel is divided into multiple domains.

As long as the second liquid crystal display device of the present invention essentially includes these components, the structure of the second liquid crystal display device of the present invention is not particularly limited by other components. For example, the second liquid crystal display device of the present invention may be provided with an electrode at positions closer to the substrate than the alignment film. The liquid crystal alignment agent usually contains a solvent commonly used for a liquid crystal alignment agent.

From the same viewpoint as that for the first liquid crystal display device of the present invention, the second liquid crystal display device of the present invention may have the following structure.

The liquid crystal display device of the present invention may have a monomolecular film formed from the silane-based coupling agent.

The alignment film and the monomolecular film are preferably bonded by a covalent bond.

The covalent bond is preferably a bond that is represented by the above formula (1) and is formed between a structure derived from a carboxyl group in the alignment film and silicon in the structure derived from the silane-based coupling agent.

The silane-based coupling agent is preferably a silane-based surfactant.

The silane-based surfactant preferably contains a linear alkyl group represented by the above formula (2).

At least one of $R^1$ and $R^2$ in formula (2) is preferably a fluorine atom.

The silane-based surfactant preferably contains a linear alkyl group represented by the above formula (3) or (4).

The silane-based surfactant preferably contains a group represented by the above formula (5). Also, n in formulas (2) to (5) is preferably an integer of 0 to 11.

The silane-based surfactant preferably contains a $SiCl_3$ group.

A pretilt angle $\theta$ of the liquid crystal molecules may satisfy $0°<\theta\leq 8°$.

A pretilt angle $\theta$ of the liquid crystal molecules may satisfy $89°<\theta\leq 90°$.

A pretilt angle $\theta$ of the liquid crystal molecules preferably satisfies $81°<\theta\leq 89°$.

The polyamic acid or the polyimide may contain a photo-reactive functional group.

It is preferable that the polyamic acid or the polyimide includes a first monomer unit with a side chain and a second monomer unit with a side chain, the side chain of the first monomer unit includes a photo-reactive functional group, and the side chain of the second monomer unit does not include a photo-reactive functional group.

The photo-reactive functional group is preferably at least one selected from the group consisting of a cinnamate group, a chalcone group, a tolan group, a coumarin group, and an azobenzene group.

The liquid crystal display device preferably includes multiple pixels each preferably provided with two or more domains.

The number of the domains is preferably four.

A yet another aspect of the present invention is a method for producing a liquid crystal display device that includes a pair of substrates and a liquid crystal layer disposed between the pair of substrates, the method including: an alignment film formation step of forming an alignment film on at least one of the pair of substrates; and a monomolecular film formation step of forming a monomolecular film on the alignment film.

Thereby, even in the case of using a polyimide-based alignment film, a monomolecular film can be adsorbed on the residual carboxyl groups of the polyimide-based alignment film, and thus the concentration of the residual carboxyl groups can be decreased with the imidization ratio being maintained at a low value. That is, a high VHR can be maintained with the residual DC voltage being reduced. Since the monomolecular film can be formed on the produced alignment film, the alignment film can be prevented from crosslinking and the silane-based coupling agent can be prevented from remaining in the alignment film. As a result, favorable alignment conditions can be achieved. Furthermore, use of a polyimide-based alignment film enables to achieve the above effects in liquid crystal display devices with various display modes.

Although a monomolecular film of course may be formed uniformly and densely on an alignment film, the monomolecular film is only required to be formed at least on the residual carboxyl groups or a structure derived from the residual carboxyl groups on the alignment film, and may not be formed uniformly and densely on the alignment film.

Since the method for producing a liquid crystal display device according to the present invention achieves a property (aligning ability) that the alignment film controls alignment of liquid crystal molecules, the monomolecular film itself may or may not have the aligning ability. In contrast, in the liquid crystal alignment film in Patent Literature 3, the silane-based surfactant itself needs to have the aligning ability. Since the alignment film in the present invention is not required to contain a resist film, it is possible to prevent a decrease in the reliability of the liquid crystal display device because of impurities coming out of the resist film.

As long as the method for producing a liquid crystal display device according to the present invention essentially includes these components and the steps, the structure of the method for producing a liquid crystal display device according to the present invention is not particularly limited by other components and steps. For example, the liquid crystal display device produced by the method for producing a liquid crystal display device according to the present invention may be provided with an electrode at positions closer to the substrate than the alignment film. In this way, the method for producing a liquid crystal display device according to the present invention may also include a step of forming an electrode on at least one of the pair of substrates before the alignment film formation step.

In the following, a preferable embodiment of the method for producing a liquid crystal display device according to the present invention is described in detail.

The alignment film formation step preferably includes a substep of applying, to at least one of the pair of substrates, a liquid crystal alignment agent containing a polyamic acid or a polyimide with an imidization ratio of less than 100%. Thereby, a polyimide-based alignment film can be formed.

The method of producing a liquid crystal display device according to the present invention preferably includes an electrode formation step of forming an electrode on at least one of the pair of substrates before the alignment film formation step. Thereby, an alignment film can be formed on an inner side (liquid crystal layer side) than the electrode, and liquid crystals can be favorably aligned.

The monomolecular film is preferably bonded to the alignment film by a covalent bond. Thereby, a monomolecular film can be more firmly arranged on the alignment film.

The monomolecular film formation step preferably includes an immersion substep of immersing a substrate with the alignment film formed thereon in a solution containing a silane-based surfactant. Thereby, a monomolecular film can be formed from a silane-based surfactant. Also, hydrophobic groups in the silane-based surfactant contribute to favorable aligning ability. Also, in the case of applying the present invention to a vertical alignment film, for example, vertical alignment of the liquid crystals can be effectively maintained. That is, narrowing of the pretilt angle caused by formation of a monomolecular film can be prevented.

The immersion substep includes heating the solution. Thereby, formation of a monomolecular film is promoted. Also, in the case of forming a polyimide-based alignment film, it is possible to react the silane-based surfactant and the carboxylic acid (carboxyl groups) in the polyimide-based alignment film at a high reaction rate in a short time.

The solution preferably contains an environmentally safe solvent. Thereby, the immersion substep can be performed in an open system. In this way, the environmentally safe solvent is preferably one that does not adversely affect the human body even when the solvent as steam is inhaled. The environmentally safe solvent is specifically a solvent that does not correspond to the first to third class organic solvents defined under the ordinance of the Industrial Safety and Health Law. More specific examples thereof include water, ethanol, N-methylpyrrolidone, γ-butyrolactone, some of weak acid aqueous solutions, and some of weak alkali aqueous solutions.

The solution preferably contains a solvent that contains at least one of water and ethanol. Since water and ethanol have almost no adverse effect on the human body or the environment, the immersion substep can be performed in an open system. Therefore, treatment for a large-sized substrate (e.g., eighth-generation mother glass) can also be performed at low cost. In contrast, in the case of using a harmful organic solvent, a sealed process and exhaust equipment are required for the heating treatment for the solvent, which requires equipment cost in the case of treating a large-sized substrate.

The alignment film preferably contains a photo-reactive functional group, and the method preferably further includes, after the monomolecular film formation step, a step of performing alignment treatment of irradiating the alignment film with ultraviolet light from a direction oblique to a normal direction of the substrate with the alignment film formed thereon. Thereby, a photo-alignment type liquid crystal display device is easily producible. Further, since the photo-alignment treatment is performed after the monomolecular film formation step, the pretilt can be controlled more surely. In contrast, in the case that photo-alignment treatment is performed before the monomolecular film formation step and that immersion into a solvent and heating are performed in the monomolecular film formation step, the pretilt angle set by the photo-alignment treatment can be changed through the immersion into the solvent and the heating. Especially in the case of using an alignment film providing a pretilt angle by photo-isomerization, the possibility of change is high. Hence, the photo-alignment treatment is preferably performed after the monomolecular film formation step.

The ultraviolet light is preferably linearly polarized light, elliptically polarized light, or circularly polarized light. Thereby, photo-alignment treatment can be effectively performed on alignment films providing a pretilt angle by photo-dimerization. Linearly polarized light is excellent in alignment stability, and elliptically polarized light or circularly polarized light is excellent in light utilization efficiency, shortening the treatment time.

The ultraviolet light is preferably unpolarized light. It is possible with unpolarized light to effectively perform photo-alignment treatment on an alignment film providing a pretilt angle through photo-isomerization reaction.

Advantageous Effects of Invention

The first and second liquid crystal display devices of the present invention can prevent a decrease in the VHR and image sticking on the display screen because of residual DC voltage, and also can produce favorable alignment conditions, in various display modes.

The method for producing a liquid crystal display device according to the present invention enables to produce a liquid crystal display device of various modes which can prevent a decrease in the VHR and image sticking on the display screen because of residual DC voltage, and also can produce favorable alignment conditions.

BRIEF DESCRIPTION OF DRAWINGS

FIG. 6(a) illustrates the state where the photo-alignment treatment directions are perpendicular to each other between the pair of substrates, and AC voltage not lower than a threshold is applied between the pair of substrates. In FIG. 6(a), the solid line arrow indicates the photo-irradiation direction (photo-alignment treatment direction) for the bottom substrate, and the dashed line arrow indicates the photo-irradiation direction (photo-alignment treatment direction) for the top substrate.

FIG. 7(a) illustrates the state where the photo-alignment treatment directions are antiparallel with each other between the pair of substrates, and AC voltage not lower than a threshold is applied between the pair of substrates. In FIG. 7(a), the solid line arrow indicates the photo-irradiation direction (photo-alignment treatment direction) for the bottom substrate, and the dashed line arrow indicates the photo-irradiation direction (photo-alignment treatment direction) for the top substrate.

FIG. 10(a) illustrates the state where AC voltage not lower than a threshold is applied between the pair of substrates. In FIG. 10(a), the solid line arrow indicates the photo-irradiation direction (photo-alignment treatment direction) for the bottom substrate (driving element substrate), and the dashed line arrow indicates the photo-irradiation direction (photo-alignment treatment direction) for the top substrate (color filter substrate).

In FIG. 11(a), the solid line arrow indicates the photo-irradiation direction (photo-alignment treatment direction) for the bottom substrate (driving element substrate), and the dashed line arrow indicates the photo-irradiation direction (photo-alignment treatment direction) for the top substrate (color filter substrate). The dashed line in FIG. 11(c) illustrates the interface between domains.

DESCRIPTION OF EMBODIMENTS

Pretilt angles, voltage holding ratios (VHRs), and residual DC voltages of the liquid crystal display devices (liquid crystal display cells) of the embodiments of the present invention were measured as described below.

(Pretilt Angle)

The pretilt angle was measured by the crystal rotation method using OMS-AF2 produced by CHUO PRECISION INDUSTRIAL CO., LTD.

(VHR)

The VHR was measured using the 6254 model liquid crystal physical property measuring system produced by TOYO Corp. More specifically, charges are charged between the electrodes at 60° C. under a voltage of 1 V for 60 μs, and then the potential between the electrodes during the open period (period for which no voltage is applied) of 16.61 ms was measured to determine the ratio of voltage to be retained.

(Residual DC Voltage)

The residual DC voltage was determined by the flicker elimination method (movement I) described in WO 2007/141935 (Patent Literature 1). More specifically, a direct current offset voltage of 5 V was applied to the liquid crystal cell for 20 hours. Then, the liquid crystal cell was driven under square wave voltage, and the direct current offset voltage applied was adjusted such that flickers would not be observed. The adjusted direct current offset voltage was taken as the residual DC voltage. The measurement was performed in a 50° C. oven, using an original device including a generator, a photo multiplier, an oscilloscope, and a computer for controlling these.

The present invention will be described in more detail below with reference to the drawings based on embodiments which, however, are not intended to limit the scope of the present invention.

First Embodiment

Figure 3:
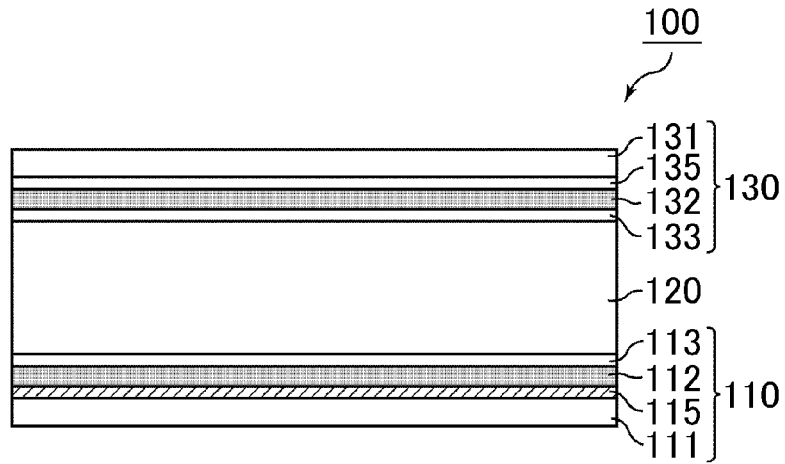
FIG. 3 is a schematic cross-sectional view illustrating the structure of the liquid crystal display device of the first embodiment.

In the present embodiment, description will be made with an example of a TN-mode liquid crystal display device having horizontal alignment films that horizontally align liquid crystals. FIG. 3 is a schematic cross-sectional view illustrating the structure of the liquid crystal display device of the present embodiment.

In FIG. 3, a liquid crystal display device 100 is provided with a TFT array substrate 110, a counter substrate 130 disposed to face the TFT array substrate 110, and a liquid crystal layer 120 disposed between the TFT array substrate 110 and the counter substrate 130.

The TFT array substrate 110 has, on the liquid crystal layer 120-side main surface of a glass substrate (supporting substrate 111), multiple gate signal lines parallel to each other, multiple source signal lines perpendicular to the gate signal lines and extending in parallel to each other, and thin film transistors (TFTs) disposed at each crossing portion of a gate signal line and a source signal line, although these components are not illustrated.

The gate signal lines and the source signal lines are covered with a gate insulating film, and drain electrodes are formed on the gate insulating film. The drain electrodes are covered with an interlayer insulating film, and pixel electrodes 115 are formed on the interlayer insulating film in such a manner so as to correspond to the respective pixels. The pixel electrodes 115 and the drain electrodes are connected to each other via contact holes formed in the interlayer insulating film. Each TFT has a gate electrode connected to a gate signal line, a source electrode connected to a source signal line, and a drain electrode.

The liquid crystal layer 120 is formed from nematic liquid crystals showing positive dielectric constant anisotropy.

The counter substrate 130 is, for example, a color filter substrate. Here, a color filter layer is provided on the main surface of the glass substrate (supporting substrate 131), and a counter electrode 135 is disposed on the color filter layer with an insulation layer therebetween. The counter electrode 135 is formed from ITO or the like.

Horizontal alignment films 112 and 132 are formed on the respective liquid crystal layer 120-side surfaces of the TFT array substrate 110 and the counter substrate 130 which have the above structures.

Furthermore, on the alignment films 112 and 132, the monomolecular films 113 and 133 are respectively formed.

The liquid crystal display device 100 having the above structure was produced as described below. First, the substrates 110 and 130 before alignment film formation were produced by a conventionally known method. Then, the following steps were performed.

(1-1. Alignment Film Formation Step)

A liquid crystal alignment agent containing a polyimide produced by imidizing a polyamic acid represented by the following formula (6) was applied to the liquid crystal layer 120-side main surface of each of the TFT array substrate 110 and the counter substrate 130. The polyimide is dissolvable in the state of polyamic acid. The polyimide is imidized by a conventionally known method (e.g., a heating method, a chemical method using a catalyst), and the imidization ratio was adjusted to 50 to 80%. Thereafter, prebaking and postbaking were performed, and thereby horizontal alignment films 112 and 132 for TN mode were formed.

[Chem. 2]

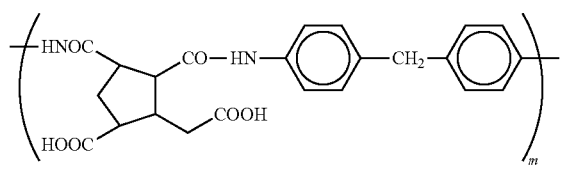

(6)

(1-2. Monomolecular Film Formation Step)

Figure 1:
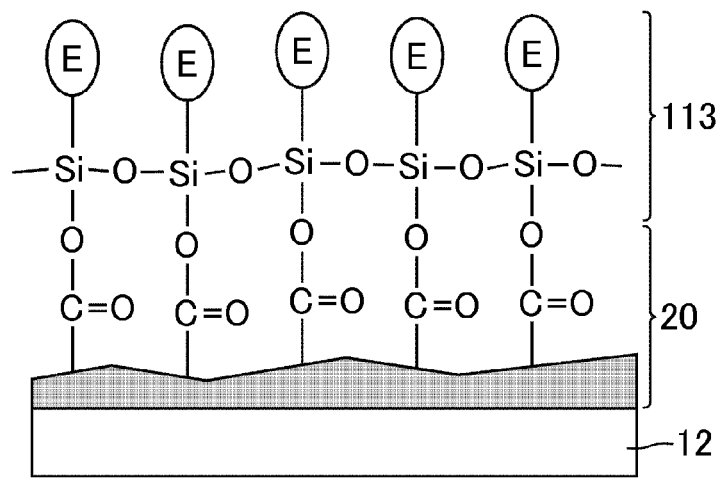
FIG. 1 is a schematic view illustrating an alignment film and a monomolecular film according to embodiments of the present invention.
Figure 2:
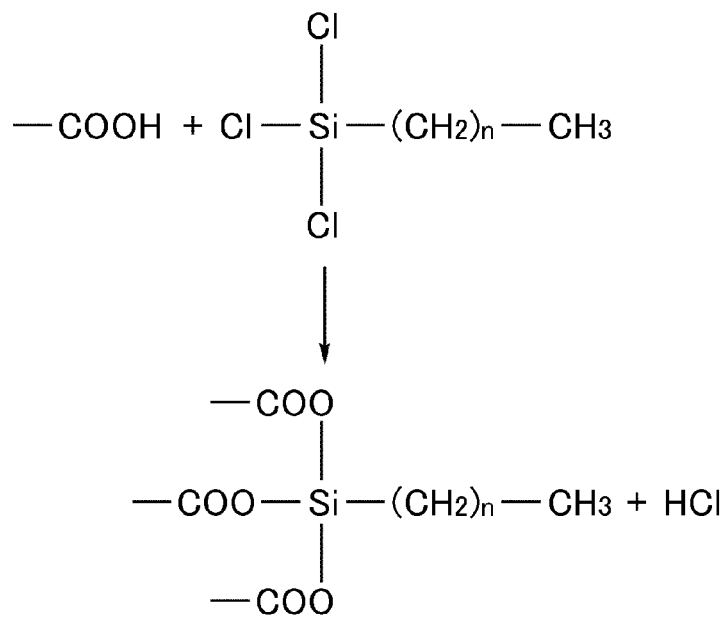
FIG. 2 is a chemical reaction formula illustrating a covalent bond between the residual carboxyl group and silane moiety according to a first embodiment.

A chlorosilane-based surfactant represented by a chemical formula $Cl_3Si—(CH_2)_n—CH_3$ was dissolved in a solvent containing at least one of water and ethanol, so that a solution was prepared. The solution was heated to 60° C., and the TFT array substrate 110 and the counter substrate 130 were immersed in the solution for 1 hour. Thereby, the monomolecular films 113 and 133 were formed on the alignment films 112 and 132. At this time, as illustrated in FIG. 2, the residual carboxyl groups derived from polyamic acid in the alignment films 112 and 132 are bonded to the chlorosilane groups of the chlorosilane-based surfactant by a covalent bond through dehydrochlorination reaction. Thereby, the residual carboxylic acid concentration can be decreased. Therefore, eliminating the residual carboxyl groups while maintaining the imidization ratio at a certain level to avoid an increase in the residual DC voltage enables to achieve a high VHR.

In the monomolecular film formation step, heating the solution makes it possible to promote the reaction between the residual carboxyl groups in the alignment films 112 and 132 and the chlorosilane-based surfactant.

Instead of immersing the substrates 110 and 130 in the solution, the solution may be applied to the substrates 110 and 130.

Thereafter, the substrates 110 and 130 were washed using a solvent containing at least one of water and ethanol. A chlorosilane-based surfactant containing a linear alkyl group represented by the above formula (2), including a chlorosilane-based surfactant represented by a chemical formula $Cl_3Si—(CH_2)_n—CH_3$, is easily dissolved in a solvent such as water and ethanol. Hence, components of the chlorosilane-based surfactant which have not reacted with the residual carboxyl groups in the monomolecular film formation step can be easily removed by washing with a solvent. Thereby, it is possible to prevent a decrease in the qualities of the liquid crystal display device because of unreacted components of the chlorosilane-based surfactant.

Since it is possible to use a very low-toxic solvent such as water and ethanol can be used, the monomolecular film formation step can be performed in an open system. For this reason, the capital investment can be made low compared to the step in a sealed system using a large-sized box and the like.

(1-3. Liquid Crystal Display Device Formation Step)

Subsequently, rubbing treatment was performed on the substrates 110 and 130. A sealant (sealing agent) was applied to one of the substrates, beads were scattered on the other of the substrates, and the substrates were attached to each other in such a manner that the rubbing directions would form an angle of 90°. The sealant is not particularly limited, and ultraviolet curable resin, thermosetting resin, and the like can be used. Liquid crystals having positive dielectric constant anisotropy were injected between the substrates, and a polarizer was disposed on the surface of each of the supporting substrates 111 and 131 on the opposite side of the liquid crystal layer 120, and thereby the TN-mode liquid crystal display device 100 including horizontal alignment films was produced. The liquid crystals may contain a chiral agent.

In the following, the present embodiment will be described in detail based on examples and comparative examples.

EXAMPLES 1 to 5

In the same manner as in the first embodiment, TN-mode liquid crystal display devices of Examples 1 to 5 were produced which included monomolecular films formed using chlorosilane-based surfactants having different linear alkyl chain lengths. Specifically, in Example 1, monomolecular films were formed using a chlorosilane-based surfactant with n in the above chemical formula=3. Similarly, monomolecular films were formed using chlorosilane-based surfactants with n=5 in Example 2, n=7 in Example 3, n=9 in Example 4, and n=11 in Example 5.

The pretilt angle, VHR, and residual DC voltage of each of the liquid crystal display devices were measured. The obtained results are shown in Table 1.

COMPARATIVE EXAMPLE 1

No chlorosilane-based surfactant was used. That is, a TN-mode liquid crystal display device of Comparative Example 1 was produced in the same manner as in the first embodiment, except that monomolecular films were not formed and the residual carboxyl groups in the alignment films were not treated. The pretilt angle, VHR, and residual DC voltage of the obtained liquid crystal display devices were measured. The obtained results are shown in Table 1.

TABLE 1

|  | Example 1 | Example 2 | Example 3 | Example 4 | Example 5 | Comparative Example 1 |
| --- | --- | --- | --- | --- | --- | --- |
| Alkyl chain length (n) | 4 (3) | 6 (5) | 8 (7) | 10 (9) | 12 (11) | N/A |
| Pretilt angle (°) | 1.5 | 1.5 | 2.5 | 4 | 8 | 1.5 |
| VHR (%) | 99.5 | 99.5 | 99.5 | 99.5 | 99.5 | 98.5 |
| Residual DC voltage (mV) | 50 | 50 | 50 | 50 | 50 | 170 |

As shown in Table 1, the VHRs in Examples 1 to 5 were as high as 99.5%. In contrast, the VHR in Comparative Example 1 was 98.5%, which was inferior to the results of Examples 1 to 5.

The residual DC voltage in Comparative Example 1 was 170 mV, whereas the residual DC voltage in each of Examples 1 to 5 was 50 mV which was lower than the result of Comparative Example 1. As above, the residual DC voltage could be maintained low while a high VHR was maintained in Examples 1 to 5.

In this way, introduction of the step of treating the alignment film surface with a chlorosilane-based surfactant enabled to achieve a high VHR and low residual DC voltage. This is probably because the carboxyl groups remaining in the polyimide-based alignment films were treated, and thereby the residual DC voltage was reduced while a high VHR was obtained.

Also, a longer alkyl chain led to a larger pretilt angle, which was probably because the long alkyl chain changed the alignment of liquid crystals from the horizontal direction to the vertical direction.

Second Embodiment

Monomolecular films were formed using a chlorosilane-based surfactant represented by the chemical formula $Cl_3Si—(CH_2)_n—NH_2$ instead of a chlorosilane-based surfactant represented by the chemical formula $Cl_3Si—(CH_2)_n—CH_3$. Except for that, a TN-mode liquid crystal display device having horizontal alignment films was produced in the same manner as in the first embodiment.

Hereinafter, the present embodiment will be described in more detail based on examples and comparative examples.

EXAMPLES 6 to 10

In the same manner as in the second embodiment, TN-mode liquid crystal display devices of Examples 6 to 10 were produced which included monomolecular films formed using chlorosilane-based surfactants having different linear alkyl chain lengths. Specifically, in Example 6, monomolecular films were formed using a chlorosilane-based surfactant with n in the above chemical formula=3. Similarly, monomolecular films were formed using chlorosilane-based surfactants with n=5 in Example 7, n=7 in Example 8, n=9 in Example 9, and n=11 in Example 10. The pretilt angle, VHR, and residual DC voltage of the obtained liquid crystal display devices were measured in the same manner as in Examples 1 to 5.

The obtained results are shown in Table 2 together with the results of Comparative Example 1.

TABLE 2

|  | Example 6 | Example 7 | Example 8 | Example 9 | Example 10 | Comparative Example 1 |
| --- | --- | --- | --- | --- | --- | --- |
| Alkyl chain length (n) | 3 (3) | 5 (5) | 7 (7) | 9 (9) | 11 (11) | N/A |
| Pretilt angle (°) | 1.5 | 1.5 | 1.5 | 1.5 | 2 | 1.5 |
| VHR (%) | 99.5 | 99.5 | 99.5 | 99.5 | 99.5 | 98.5 |
| Residual DC voltage (mV) | 50 | 50 | 50 | 50 | 50 | 170 |

Table 2 shows that, similarly to Examples 1 to 5, both the VHR and residual DC voltage values in Examples 6 to 10 were better than those in Comparative Example 1; that is, the residual DC voltage was made low while a high VHR was maintained.

A longer linear alkyl chain led to a larger pretilt angle in Examples 1 to 5, whereas an increase in the linear chain structure did not change the pretilt angle much in Examples 6 to 10.

In this way, introduction of the step of treating the alignment film surface with a chlorosilane-based surfactant enabled to achieve a high VHR and low residual DC voltage. Further introduction of an amino group ($—NH_2$) at an alkyl chain terminal to lengthen the alkyl chain changed the pretilt angle very slightly. This is probably because the compatibility between the terminal amino group and the liquid crystals is different from the compatibility between the methyl group and the liquid crystals.

Third Embodiment

Figure 4:
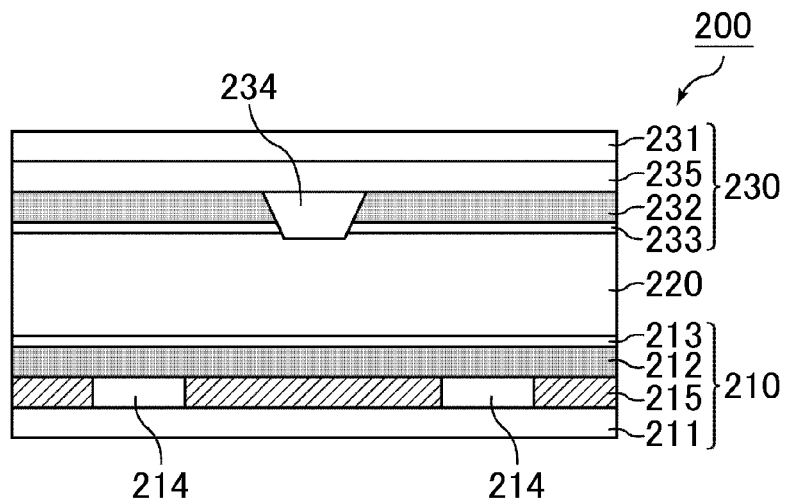
FIG. 4 is a schematic cross-sectional view illustrating the structure of a liquid crystal display device of a third embodiment.

The present embodiment is described based on an example of a VA-mode liquid crystal display device having vertical alignment films for vertically aligning liquid crystals. FIG. 4 is a schematic cross-sectional view illustrating the structure of the liquid crystal display device of the present embodiment.

In FIG. 4, a liquid crystal display device 200 is provided with a TFT array substrate 210, a counter substrate 230 disposed to face the TFT array substrate 210, and a liquid crystal layer 220 disposed between the TFT array substrate 210 and the counter substrate 230.

The TFT array substrate 210 has TFTs and various wirings on the liquid crystal layer 220-side main surface of the glass substrate (supporting substrate 211) in the same manner as the TFT array substrate 110 in the first embodiment.

Pixel electrodes 215 are formed to correspond to the respective pixels, and each of the pixel electrodes has multiple slits 214 for controlling the alignment of the liquid crystals. The slits 214 each have a V shape when the substrate surface is viewed from the normal direction, and are arranged at equal intervals. An alignment film 212 is formed on the liquid crystal layer 220-side surface of the TFT array substrate 210, and a monomolecular film 213 is formed on the alignment film 212.

The liquid crystal layer 220 is not particularly limited as long as it is used in a VA-mode liquid crystal display device, and nematic liquid crystals having negative dielectric constant anisotropy, for example, can be used.

The counter substrate 230 includes a glass substrate (supporting substrate 231) and a counter electrode 235 disposed to face the pixel electrodes 215, and has projections 234 forming ribs on the liquid crystal layer 220-side surface. The multiple projections 234 are for controlling the alignment conditions of the liquid crystals, and are belt-like objects that have a V shape in a view of the substrate surface from the normal direction and are arranged at equal intervals.

The counter substrate 230 is, for example, a color filter substrate. Here, a color filter layer is provided on the main surface of the supporting substrate 231, and the counter electrode 235 is disposed on the color filter layer with an insulating layer therebetween. The counter electrode 235 is formed from ITO or the like. An alignment film 232 is formed on the liquid crystal layer 220-side surface of the counter substrate, and a monomolecular film 233 is formed on the alignment film 232.

The slits 214 and the projections 234 are alternately arranged at equal intervals when the substrate surface is viewed from the normal direction. In such arrangement, liquid crystal molecules are aligned almost evenly in each pixel, and uniform display can be achieved in a wide viewing angle.

The liquid crystal display device 200 having the above structure was produced as described below. First, the substrates 210 and 230 before alignment film formation were produced by a conventionally known method. Then, the following steps are performed.

(2-1. Alignment Film Formation Step)

To the liquid crystal layer 220-side main surface of each of the TFT array substrate 210 and the counter substrate 230, a liquid crystal alignment agent was applied which contained a polyimide produced by polymerizing (copolymerizing), by a conventionally known method, at least one of an acid anhydride represented by the following chemical formulas (7) to (13) and at least one of diamine monomers containing vertically aligning functional groups represented by the following chemical formulas (14) to (20). The polyimide is imidized by a conventionally known method (e.g., a heating method, a chemical method using a catalyst), and the imidization ratio was adjusted to 20 to 50%. Thereafter, prebaking and postbaking were performed, and thereby vertical alignment films 212 and 232 for VA mode were formed.

[Chem. 3]

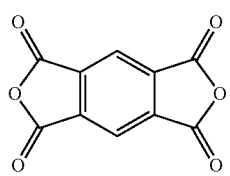

(7)

[Chem. 4]

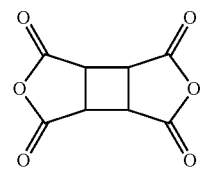

(8)

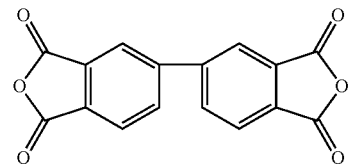

(9)

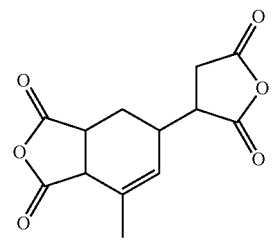

(10)

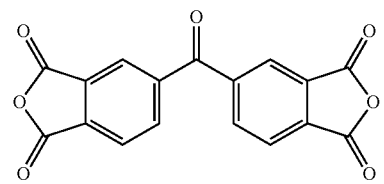

(11)

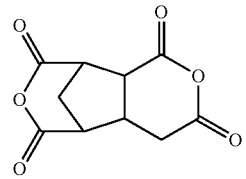

(12)

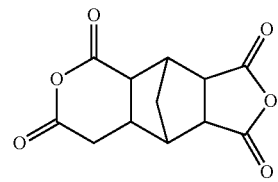

(13)

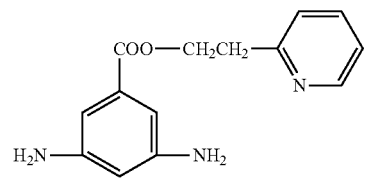

(14)

-continued

(15)
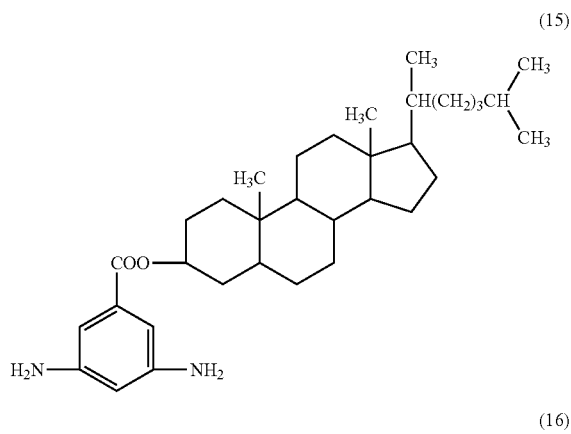

(16)
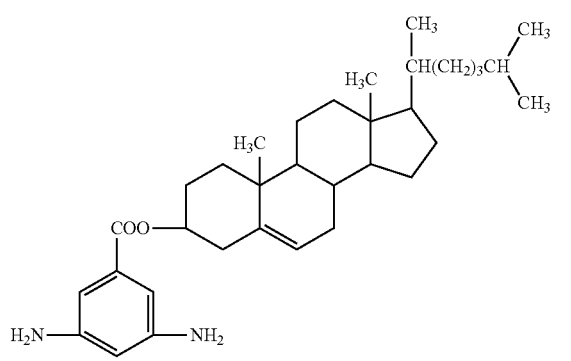

(17)
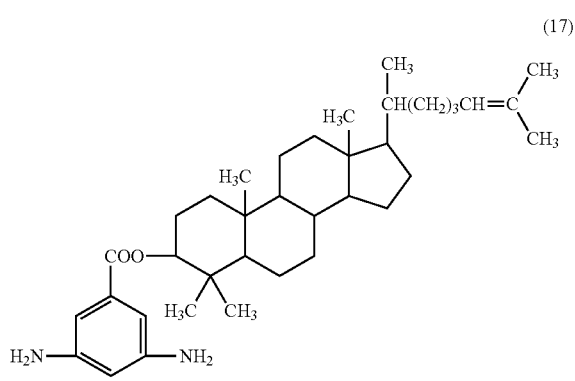

(18)
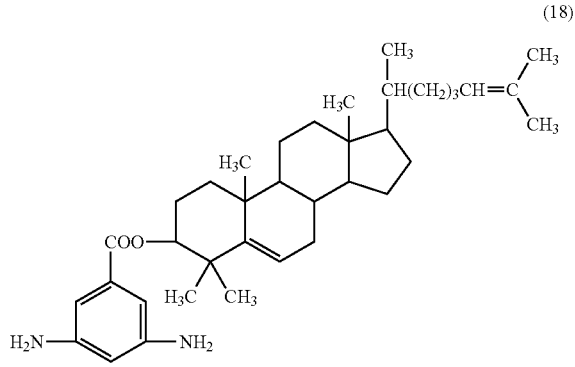

-continued

(19)
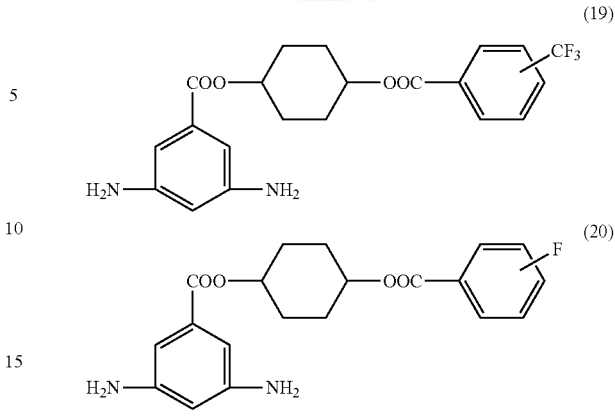

(20)
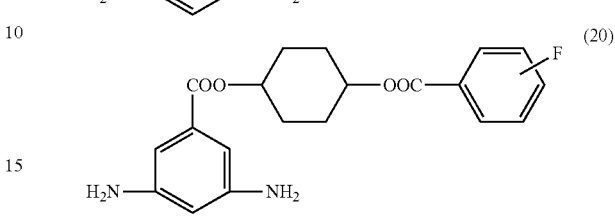

(2-2. Monomolecular Film Formation Step)

A chlorosilane-based surfactant represented by a chemical formula $Cl_3Si-(CH_2)_n-CH_3$ was dissolved in a solvent containing at least one of water and ethanol, so that a solution was prepared. The solution was heated to 60° C., and the TFT array substrate 210 and the counter substrate 230 were immersed in the solution for 1 hour. Thereby, the monomolecular films 213 and 233 were formed on the alignment films 212 and 232. At this time, as illustrated in FIG. 2, the residual carboxyl groups derived from polyamic acid in the alignment films 212 and 232 are bonded to the chlorosilane groups of the chlorosilane-based surfactant by a covalent bond through dehydrochlorination reaction. Thereby, the residual carboxylic acid concentration can be decreased. Therefore, eliminating the residual carboxyl groups while maintaining the imidization ratio at a certain level to avoid an increase in the residual DC voltage enables to achieve a high VHR.

In the monomolecular film formation step, heating the solution makes it possible to promote the reaction between the residual carboxyl groups in the alignment films 212 and 232 and the chlorosilane-based surfactant.

Instead of immersing the substrates 210 and 230 in the solution, the solution may be applied to the substrates 210 and 230.

Thereafter, the substrates 210 and 230 were washed using a solvent containing at least one of water and ethanol. A chlorosilane-based surfactant containing a linear alkyl group represented by the above formula (2), including a chlorosilane-based surfactant represented by a chemical formula $Cl_3Si-(CH_2)_n-CH_3$, is easily dissolved in a solvent such as water and ethanol. Hence, components of the chlorosilane-based surfactant which have not reacted with the residual carboxyl groups in the monomolecular film formation step can be easily removed by washing with a solvent. Thereby, it is possible to prevent a decrease in the qualities of the liquid crystal display device because of unreacted components of the chlorosilane-based surfactant.

(2-3. Liquid Crystal Display Device Formation Step)

A sealant (sealing agent) was applied to one of the substrates, beads were scattered on the other one of the substrates, and the substrates were attached to each other. The sealant is not particularly limited, and ultraviolet curable resin, thermosetting resin, and the like can be used. Liquid crystals having negative dielectric constant anisotropy were injected between the substrates, and a polarizer was disposed on the surface of each of the supporting substrates 211 and 231 on the opposite side of the liquid crystal layer 220, and thereby the VA-mode liquid crystal display device 200 including vertical alignment films was produced.

Hereinafter, the present embodiment will be described in more detail based on examples and comparative examples.

EXAMPLES 11 to 15

In the same manner as in the third embodiment, VA-mode liquid crystal display devices of Examples 11 to 15 were produced which included monomolecular films formed using chlorosilane-based surfactants having different linear alkyl chain lengths. Specifically, in Example 11, a monomolecular film was formed using a chlorosilane-based surfactant with n in the above chemical formula=3. Similarly, monomolecular films were formed using chlorosilane-based surfactants with n=5 in Example 12, n=7 in Example 13, n=9 in Example 14, and n=11 in Example 15.

The pretilt angle, VHR, and residual DC voltage of each of the liquid crystal display devices were measured. The obtained results are shown in Table 3.

COMPARATIVE EXAMPLE 2

No chlorosilane-based surfactant was used. That is, a VA-mode liquid crystal display device of Comparative Example 2 was produced in the same manner as in Example 11, except that monomolecular films were not formed and the residual carboxyl groups in the alignment films were not treated. The pretilt angle, VHR, and residual DC voltage of the obtained liquid crystal display devices were measured. The obtained results are shown in Table 3.

TABLE 3

|  | Example 11 | Example 12 | Example 13 | Example 14 | Example 15 | Comparative Example 2 |
|---|---|---|---|---|---|---|
| Alkyl chain length (n) | 4 (3) | 6 (5) | 8 (7) | 10 (9) | 12 (11) | N/A |
| Pretilt angle (°) | 90 | 90 | 90 | 90 | 90 | 90 |
| VHR (%) | 99.5 | 99.5 | 99.5 | 99.5 | 99.5 | 98.5 |
| Residual DC voltage (mV) | 70 | 70 | 70 | 70 | 70 | 220 |

As shown in Table 3, the VHRs in the VA-mode liquid crystal display devices of Examples 11 to 15 in which the liquid crystal molecules were vertically aligned were as high as 99.5%. In contrast, the VHR in Comparative Example 2 was 98.5%, which was inferior to the results of Examples 11 to 15.

The residual DC voltage in Comparative Example 2 was 220 mV, whereas the residual DC voltage in each of Examples 11 to 15 was as low as 70 mV. Similarly to the aforementioned other examples, the residual DC voltage could be maintained low while a high VHR was maintained in Examples 11 to 15.

The pretilt angle in each of Examples 11 to 15 and Comparative Example 2 was 90°. That is, the linear alkyl chain in the chlorosilane-based surfactant did not affect the alignment of the liquid crystal molecules in the present embodiment in which the liquid crystal molecules were vertically aligned.

In this way, introduction of the step of treating the alignment film surface with a chlorosilane-based surfactant enabled to achieve a high VHR and low residual DC voltage. This is probably because the carboxyl groups remaining in the polyimide-based alignment film were treated, and thereby the residual DC voltage was reduced while a high VHR was obtained.

In the case of the VA mode, the pretilt angle is 90° regardless of the alkyl chain length. This is probably because the polyimide as a vertical alignment film component sufficiently maintains the vertical alignment.

Fourth Embodiment

Figure 5:
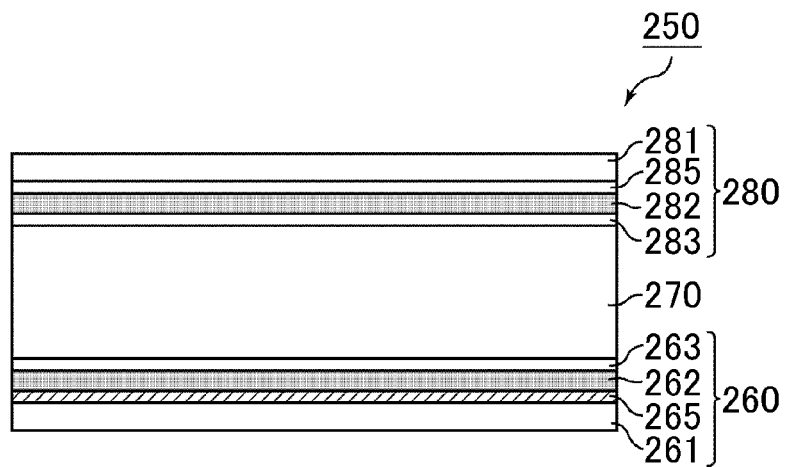
FIG. 5 is a schematic cross-sectional view illustrating the structure of a liquid crystal display device of a fourth embodiment.

The present embodiment will be described based on an example of an RTN-mode liquid crystal display device provided with a photo-alignment film having vertically aligning ability. FIG. 5 is a schematic cross-sectional view of a liquid crystal display device of the present embodiment.

In FIG. 5, a liquid crystal display device 250 is provided with a TFT array substrate 260, a counter substrate 280 disposed to face the TFT array substrate 260, and a liquid crystal layer 270 disposed between the TFT array substrate 260 and the counter substrate 280.

The TFT array substrate 260 has, on the liquid crystal layer 270-side main surface of a glass substrate (supporting substrate 261), multiple gate signal lines parallel to each other, multiple source signal lines perpendicular to the gate signal lines and extending in parallel to each other, and thin film transistors (TFTs) disposed at each crossing portion of a gate signal line and a source signal line, although these components are not illustrated.

The gate signal lines and the source signal lines are covered with a gate insulating film, and drain electrodes are formed on the gate insulating film. The drain electrodes are covered with an interlayer insulating film, and pixel electrodes 265 are formed on the interlayer insulating film in such a manner so as to correspond to the respective pixels. The pixel electrodes 265 and the drain electrodes are connected to each other via the contact holes formed in the interlayer insulating film. Each TFT has a gate electrode connected to a gate signal line, a source electrode connected to a source signal line, and a drain electrode.

The liquid crystal layer 270 is formed from nematic liquid crystals showing negative dielectric constant anisotropy.

The counter substrate 280 is, for example, a color filter substrate. Here, a color filter layer is provided on the main surface of the glass substrate (supporting substrate 281), and a counter electrode 285 is disposed on the color filter layer with an insulation layer therebetween. The counter electrode 285 is formed from ITO or the like.

Horizontal alignment films 262 and 282 are formed on the respective liquid crystal layer 270-side surfaces of the TFT array substrate 260 and the counter substrate 280 which have the above structures.

Further, on the alignment films 262 and 282, the monomolecular films 263 and 283 are respectively formed.

Figure 6:
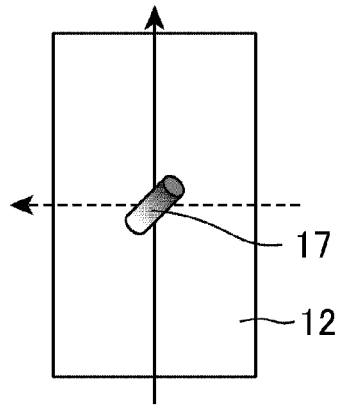
FIG. 6(a) is a schematic plan view illustrating a liquid crystal director direction in one pixel (or one sub-pixel) and photo-alignment treatment directions for a pair of substrates (top and bottom substrates) in the case that the liquid crystal display device of the first embodiment has a mono-domain structure.
FIG. 6(b) is a schematic view illustrating absorption axis directions of polarizers provided in the liquid crystal display device illustrated in FIG. 6(a).
Figure 6:
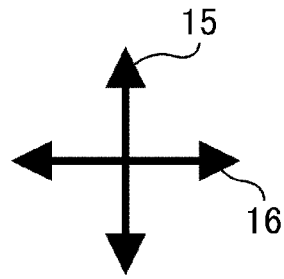

As illustrated in FIG. 6(a), the liquid crystal display device of the present embodiment is formed through exposure of the alignment films and attachment of the substrates such that the photo-irradiation directions for a pair of substrates (top and bottom substrates 12) in a plan view of the substrates are substantially perpendicular to each other. Here, the pretilt angles of the liquid crystal molecules in the vicinity of the alignment films disposed on the respective top and bottom substrates 12 are substantially the same, and a liquid crystal material containing no chiral material is injected into the liquid crystal layer. If AC voltage not lower than a threshold is applied between the top and bottom substrates 12, the liquid crystal molecules are twisted 90° in the normal direction of the substrate surfaces between the top and bottom substrates 12, and the average liquid crystal director direction 17 under the application of AC voltage appears to be along a line that halves an angle formed by the photo-irradiation directions for the top and bottom substrates 12 in a plan view of the substrates 12, as illustrated in FIG. 6. FIG. 6(*b*) illustrates that the absorption axis direction 16 of the polarizer (upper polarizer) arranged on the top substrate side is the same as the photo-alignment treatment direction for the top substrate. Also, the absorption axis direction 15 of the polarizer (lower polarizer) arranged on the bottom substrate side is the same as the photo-alignment treatment direction for the bottom substrate.

The liquid crystal display device 250 having the above structure was produced as described below. First, the substrates 260 and 280 before alignment film formation were produced by a conventionally known method. Then, the following steps were performed.

(3-1. Alignment Film Formation Step)

To the liquid crystal layer 270-side main surface of each of the TFT array substrate 260 and the counter substrate 280, a liquid crystal alignment agent was applied which contained a polyimide produced by polymerizing (copolymerizing), by a conventionally known method, at least one of an acid anhydride represented by the above chemical formulas (7) to (13) and at least one of diamine monomers containing photo-reactive functional groups in their side chains represented by the following chemical formulas (21) to (44). The polyimide is imidized by a conventionally known method (e.g., a heating method, a chemical method using a catalyst), and the imidization ratio was adjusted to 20 to 50%. In addition to the diamine monomers containing photo-reactive functional groups in their side chains, a diamine monomer containing no photo-reactive functional groups in a side chain may be added to the monomer component. Thereafter, prebaking and postbaking were performed, and thereby vertical alignment films 262 and 282 for RTN mode were formed.

[Chem. 5]

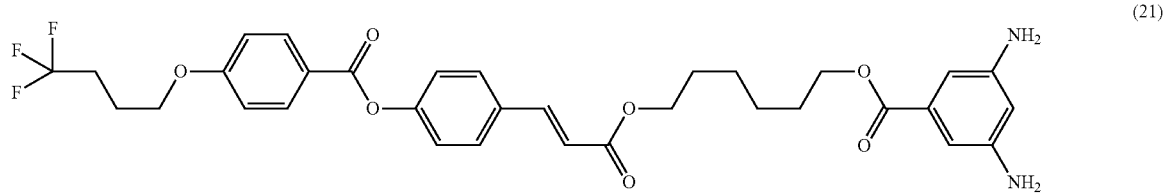

(21)

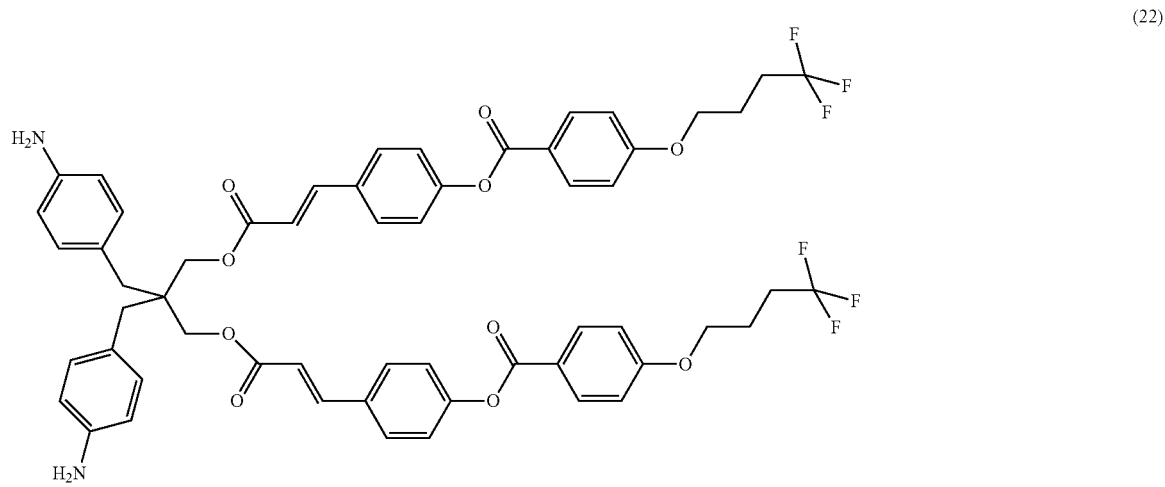

(22)

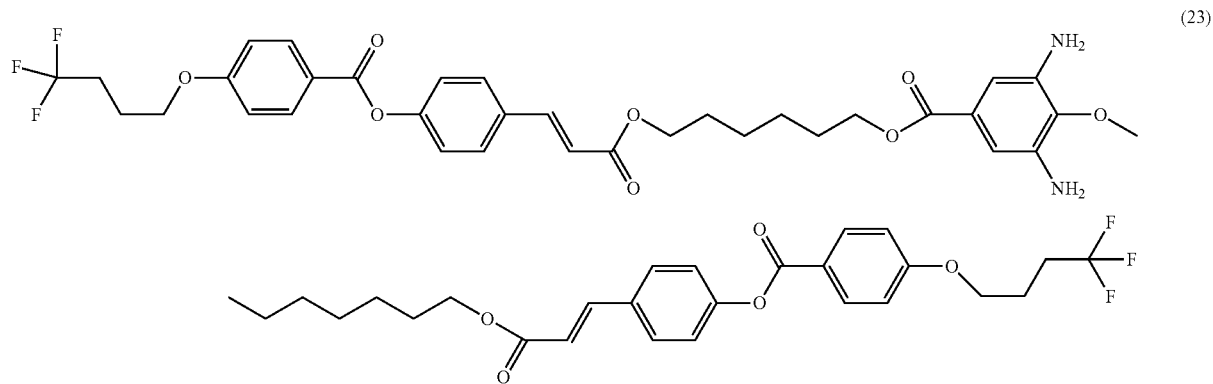

(23)

(24)
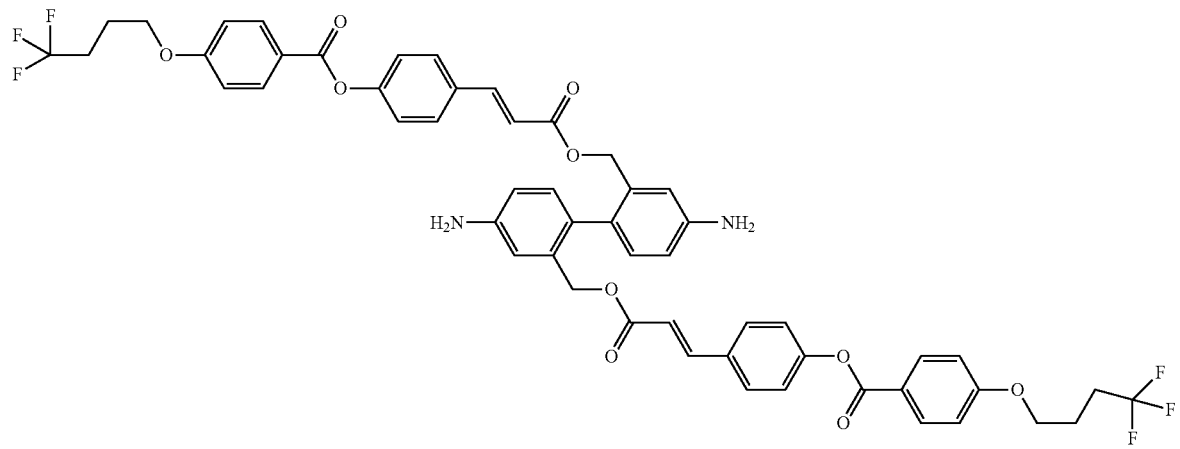
[Chem. 6]
(25)
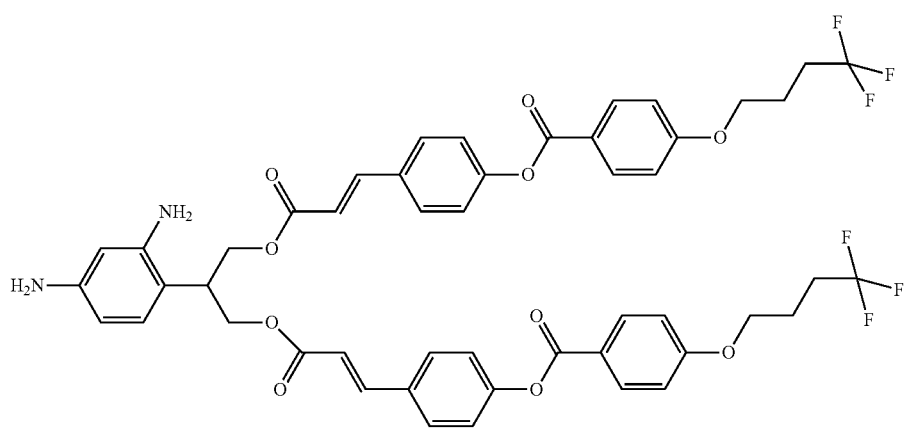
(26)
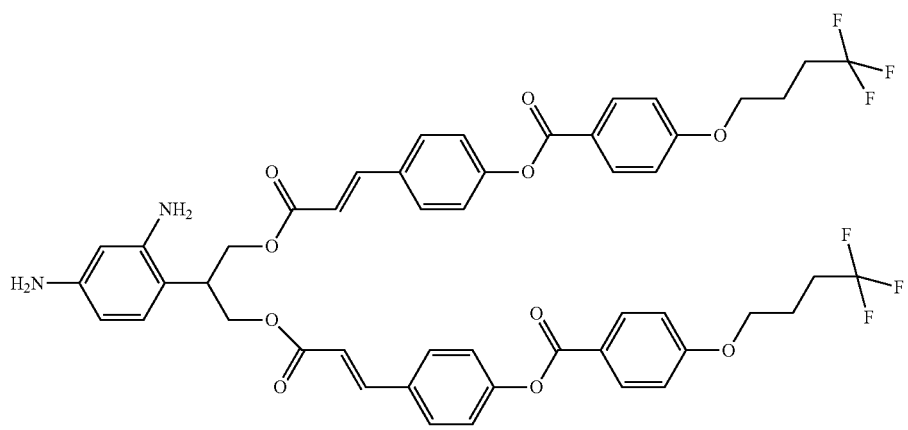
(27)
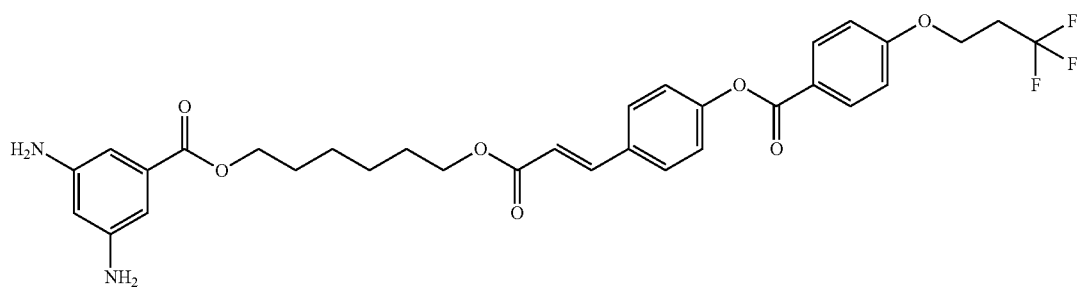

(28)
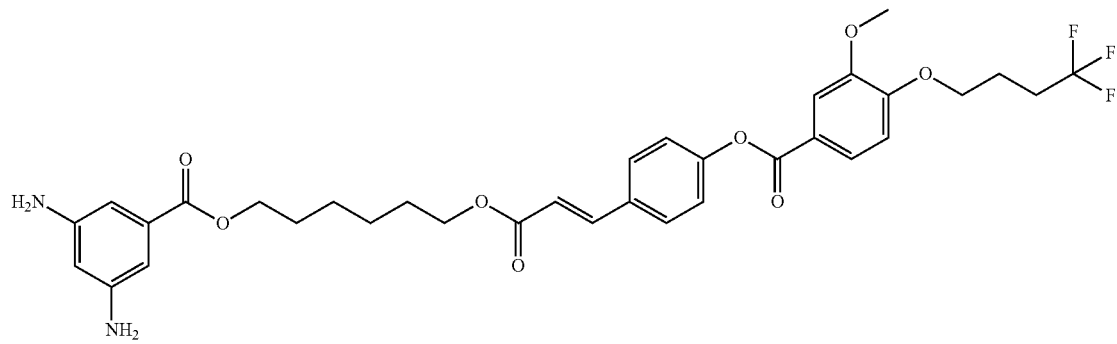
(29)
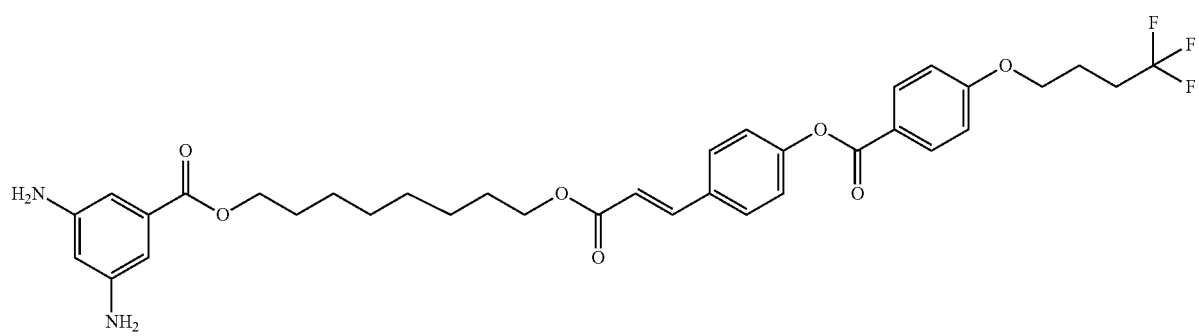
(30)
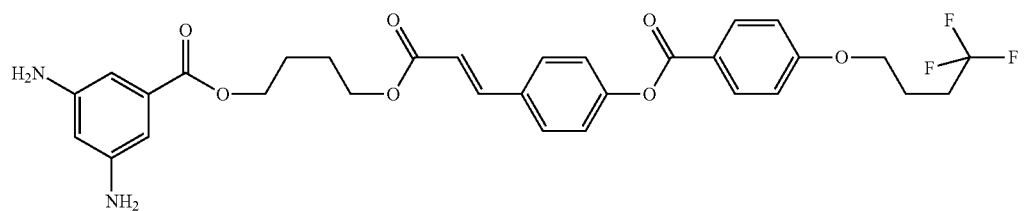
[Chem. 7]
(31)
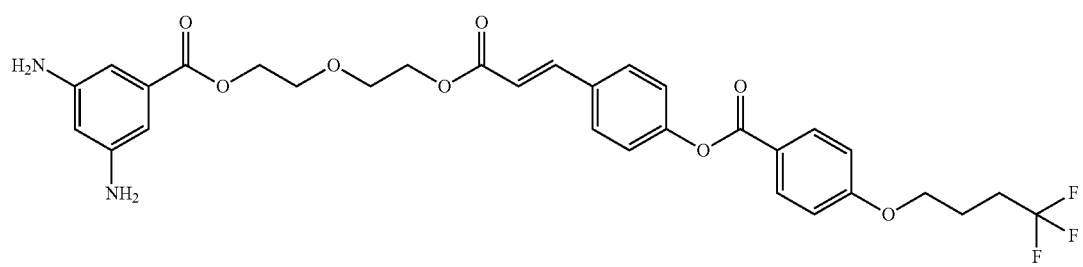
(32)
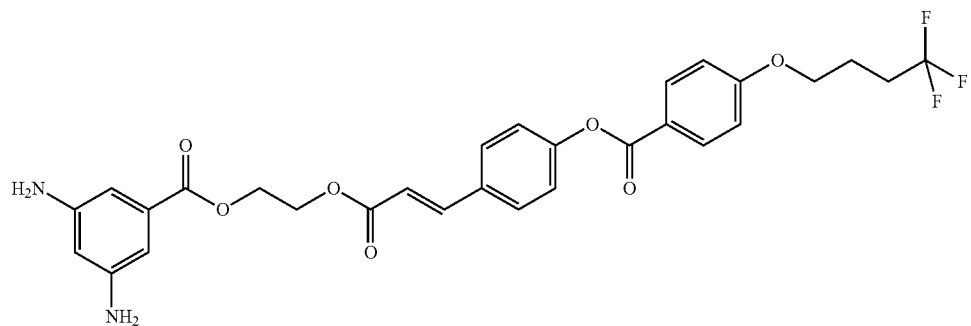

(33)
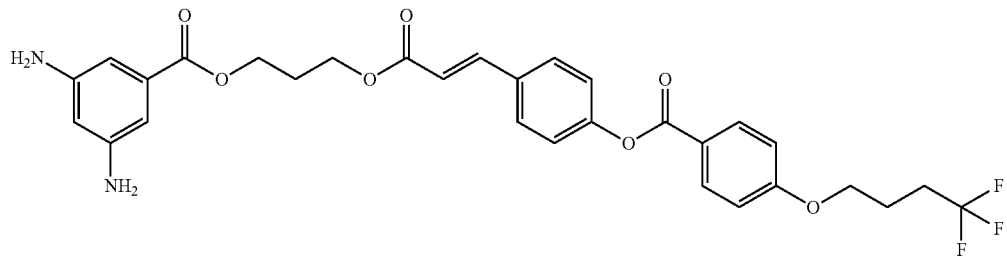
(34)
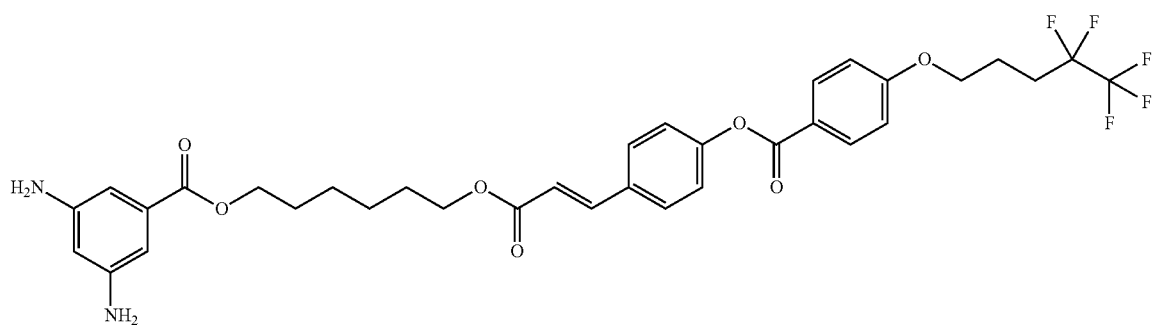
(35)
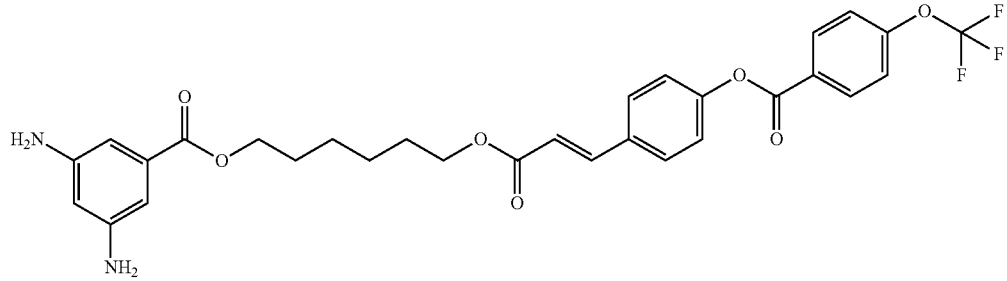
(36)
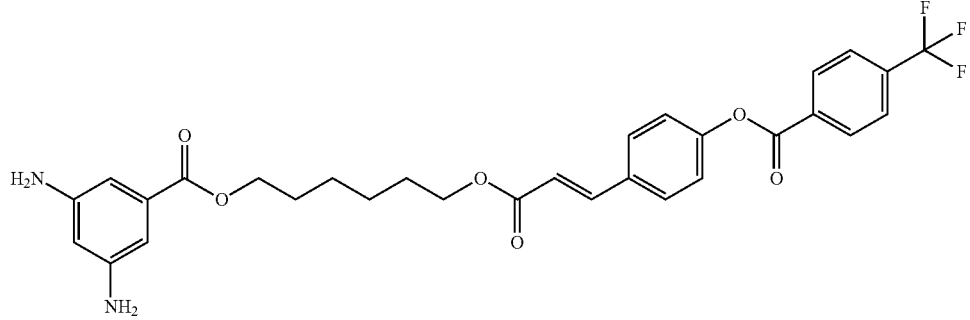
[Chem. 8]
(37)
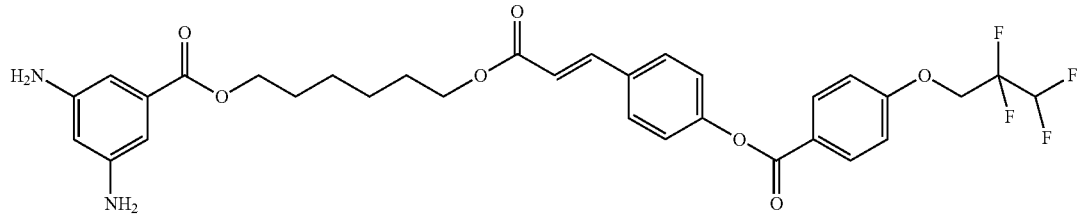

-continued
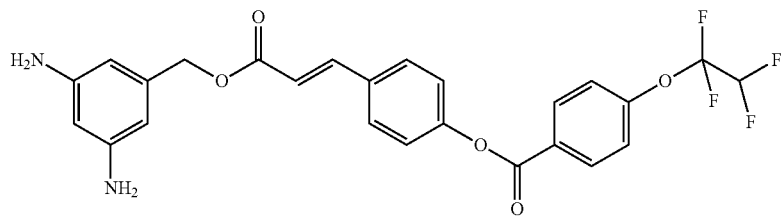
(38)
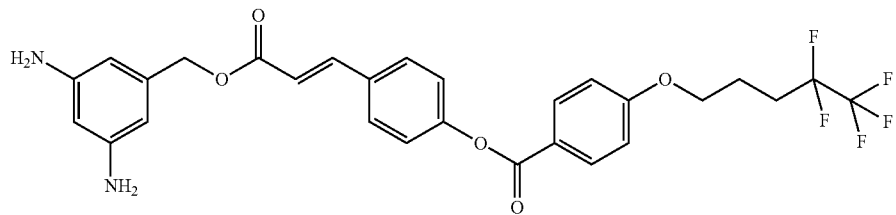
(39)
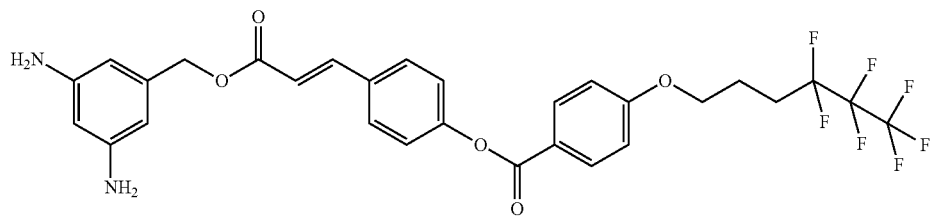
(40)
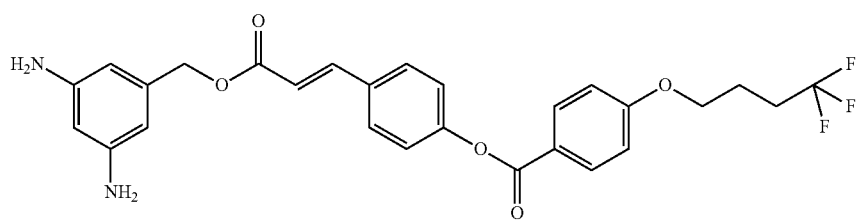
(41)
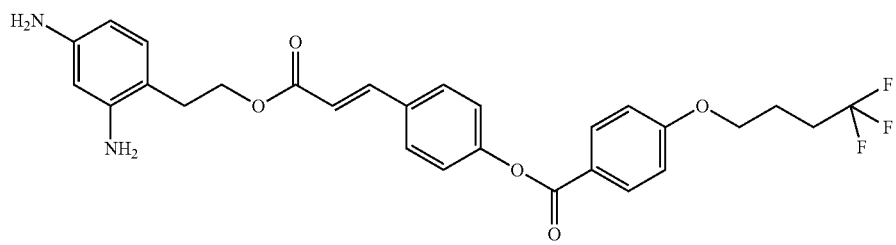
(43)
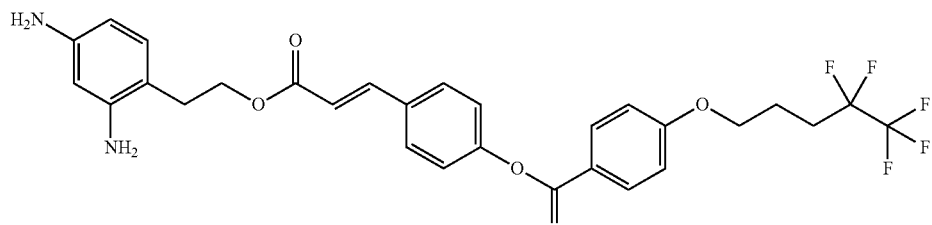
(43)
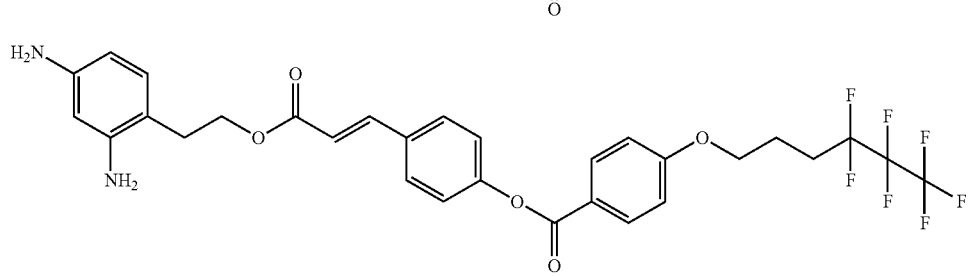
(44)

(3-2. Monomolecular Film Formation Step)

A chlorosilane-based surfactant represented by a chemical formula $Cl_3Si-(CH_2)_n-CH_3$ was dissolved in a solvent containing at least one of water and ethanol, so that a solution was prepared. The solution was heated to 60° C., and the TFT array substrate 260 and the counter substrate 280 were immersed in the solution for 1 hour. Thereby, the monomolecular films 263 and 283 were formed on the alignment films 262 and 282. At this time, as illustrated in FIG. 2, the residual carboxyl groups derived from polyamic acid in the alignment films 262 and 282 are bonded to the chlorosilane groups of the chlorosilane-based surfactant by a covalent bond through dehydrochlorination reaction. Thereby, the residual carboxylic acid concentration can be decreased. Therefore, eliminating the residual carboxyl groups while maintaining the imidization ratio at a certain level to avoid an increase in the residual DC voltage enables to achieve a high VHR.

In the monomolecular film formation step, heating the solution makes it possible to promote the reaction between the residual carboxyl groups in the alignment films 262 and 282 and the chlorosilane-based surfactant.

Instead of immersing the substrates 260 and 280 in the solution, the solution may be applied to the substrates 260 and 280.

Thereafter, the substrates 260 and 280 were washed using a solvent containing at least one of water and ethanol. A chlorosilane-based surfactant containing a linear alkyl group represented by the above formula (2), including a chlorosilane-based surfactant represented by a chemical formula $Cl_3Si-(CH_2)_n-CH_3$, is easily dissolved in a solvent such as water and ethanol. Hence, components of the chlorosilane-based surfactant which have not reacted with the residual carboxyl groups in the monomolecular film formation step can be easily removed by washing with a solvent. Thereby, it is possible to prevent a decrease in the qualities of the liquid crystal display device because of the unreacted components of the chlorosilane-based surfactant.

(3-3. Photo-alignment Treatment Step)

The substrates 260 and 280 with monomolecular films 263 and 283, formed on the alignment films 262 and 282 through the above alignment film formation step and the monomolecular film formation step, were irradiated with ultraviolet light from an oblique direction for alignment treatment. Ultraviolet light is preferably linearly polarized light, elliptically polarized light, or circularly polarized light in the case that alignment is made through photo-dimerization reaction. Unpolarized light is preferred in the case that alignment is made through photo-isomerization reaction.

The photo-alignment treatment step may be performed before the monomolecular film formation step. Still, since immersion into a solution or heating at the monomolecular film formation step may possibly change the aligning ability, the photo-alignment treatment is preferably performed after formation of the monomolecular film. Especially in the case of providing alignment through photo-isomerization reaction, the photo-alignment treatment is preferably performed after formation of the monomolecular film.

(3-4. Liquid Crystal Display Device Formation Step)

A sealant (sealing agent) was applied to one of the substrates, beads were scattered on the other one of the substrates, and the substrates were attached to each other in such a manner that the alignment directions would form an angle of 90°. The sealant is not particularly limited, and ultraviolet curable resin, thermosetting resin, and the like can be used. Liquid crystals having negative dielectric constant anisotropy were injected between the substrates, and a polarizer was disposed on the surface of each of the supporting substrates 261 and 281 on the opposite side of the liquid crystal layer 270, and thereby the RTN-mode liquid crystal display device 250 including vertical alignment films was produced.

As illustrated in FIG. 7(a), the liquid crystal display device of the present embodiment may be formed through exposure of the alignment films and attachment of the substrates such that the photo-irradiation directions for the top and bottom substrates 12 in a plan view of the substrates are substantially parallel to each other and point opposite directions (i.e., they are antiparallel). Here, the pretilt angles of the liquid crystal molecules in the vicinity of the photo-alignment films disposed on the respective top and bottom substrates 12 may be substantially the same, and a liquid crystal material containing no chiral material may be injected into the liquid crystal layer. In this case, liquid crystal molecules 11 near the interface between the top and bottom substrates 12 and the liquid crystal layer under no voltage application between the top and bottom substrates 12 are in a homogeneous structure (homogeneous alignment) with a pretilt angle of about 88.5°. Also, the average liquid crystal director direction 17 under AC voltage application appears to be along a line along the photo-irradiation directions for the top and bottom substrates 12 in a plan view of the substrates, as illustrated in FIG. 7(a). As illustrated in FIG. 7(b), the absorption directions 15 and 16 of the polarizer on the top substrate side (upper polarizer) and the polarizer on the bottom substrate side (lower polarizer) are 45° off from the photo-alignment treatment directions of the top and bottom substrates in a plan view of the substrates. In the case of performing such an alignment treatment for the alignment film and arranging the polarizers, the liquid crystal display device of the present embodiment is in a vertical alignment electrically controlled birefringence (VAECB) mode in which the photo-alignment treatment directions are antiparallel to each other between the top and bottom substrates and the liquid crystal molecules are vertically aligned. The solid line arrow in FIG. 7(a) indicates the photo-irradiation direction (photo-alignment treatment direction) for the bottom substrate, and the dashed line arrow indicates the photo-irradiation direction (photo-alignment treatment direction) for the top substrate.

Figure 8:
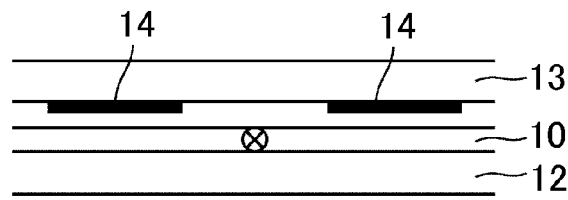
FIG. 8 is a schematic cross-sectional view illustrating a first arrangement relationship between the substrate and a photomask in a photo-alignment treatment process of the first embodiment for dividing alignment by a proximity exposure method using an alignment mask.
Figure 9:
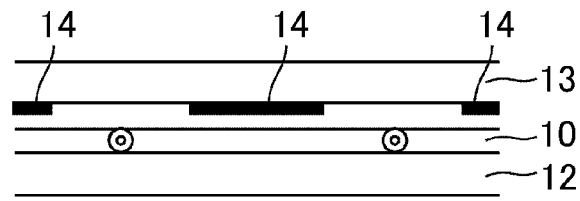
FIG. 9 is a schematic cross-sectional view illustrating a second arrangement relationship between the substrate and a photomask in a photo-alignment treatment process of the first embodiment for dividing alignment by a proximity exposure method using an alignment mask.
Figure 10:
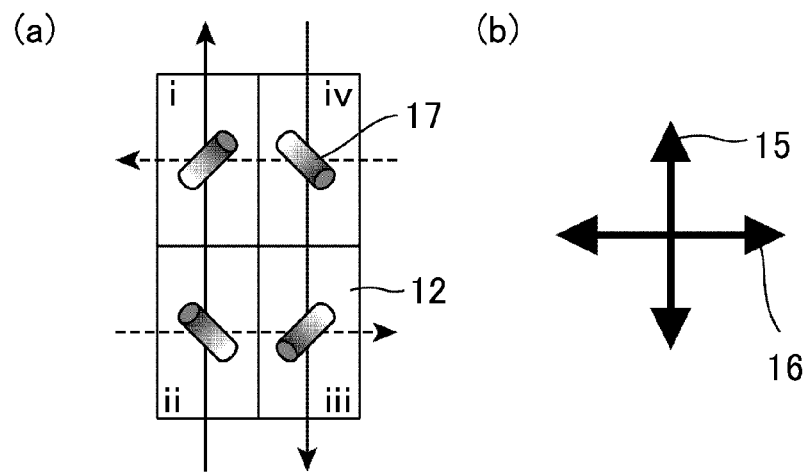
FIG. 10(a) is a schematic plan view illustrating an average liquid crystal director direction in one pixel (or one sub-pixel) and photo-alignment treatment directions for a pair of substrates (top and bottom substrates) in the case that the liquid crystal display device of the first embodiment has a four-domain structure.
FIG. 10(b) is a schematic view illustrating absorption axis directions of polarizers provided in the liquid crystal display device illustrated in FIG. 10(a).

As illustrated in FIG. 10(a), the liquid crystal display device of the present embodiment may be in a so-called 4D-RTN mode in which each pixel is divided into four portions for alignment. In the exposure step for forming four domains in the liquid crystal display device of the present embodiment, exposure is performed using a photomask 13 that has light-shielding portions 14 each having a size of the half of one pixel (or one sub-pixel) so that halves of regions each corresponding to the half of one pixel (or one sub-pixel) are exposed in one direction (in FIG. 9, from the side drawn in the figure to the depth), and the other halves of the regions are shielded from light by the light-shielding portions 14. Next, as illustrated in FIG. 9, the photomask 13 is shifted by a distance equal to about a half of a pixel (sub-pixel) pitch so that the exposed regions are shielded by the light-shielding portions 14 and the regions which have not been exposed (the unexposed regions in the step described using FIG. 8) are exposed in the reverse direction (in FIG. 9, from the depth to the side drawn in the figure). Thereby, the regions, giving the pretilt angles for liquid crystals in the opposite directions from each other, are formed in a stripe arrangement in such a manner that each pixel (sub-pixel) is divided into two regions in the liquid crystal display device.

In this way, each pixel (or each sub-pixel) is provided with a multi-domain alignment to halve each pixel (or each sub-pixel) in the substrates at equal pitches. Then, the top and bottom substrates 12 are arranged (attached) such that the alignment division directions (photo-alignment treatment directions) for the top and bottom substrates 12 are perpendicular to each other in a plan view of the substrates. Also, a liquid crystal material containing no chiral material is injected into the liquid crystal layer. Thereby, the four-domain alignment illustrated in FIG. 10(a) can be provided in which the alignment directions of the liquid crystal molecules are different from (specifically, substantially perpendicular to) each other in the four regions (i to iv in FIG. 10(a)) near the center of the liquid crystal layer in the thickness direction. That is, as illustrated in FIG. 10(a), the average liquid crystal director direction 17 under AC voltage application appears to be along a line that halves an angle formed by the photo-irradiation directions for the respective top and bottom substrates 12 in each domain in a plan view of the substrates. FIG. 10(b) illustrates that the photo-alignment treatment direction (in FIG. 10(a), dashed line arrows) for the top substrate (color filter substrate) is the same as the absorption axis direction 16 of the polarizer arranged on the top substrate side, and the photo-alignment treatment direction (in FIG. 10(a), solid line arrows) for the bottom substrate (driving element substrate) is the same as the absorption axis direction 15 of the polarizer arranged on the bottom substrate side, in a plan view of the substrates.

On the boundaries between domains, the alignment direction of the liquid crystal molecules on one of the substrates is the same as the absorption axis direction of the polarizer, and the alignment direction of the liquid crystal molecules on the other of the substrates is almost perpendicular to the substrates. Therefore, the boundaries between the domains do not transmit light even under voltage application between the substrates in the case that the polarizers are arranged in crossed Nicols, and thus the boundaries appear to be dark lines.

As described above, in the case that four domains in each of which alignment directions of liquid crystal molecules are different from (substantially perpendicular to) each other are formed, excellent viewing angle characteristics, i.e., a wide viewing angle, can be achieved.

Figure 11:
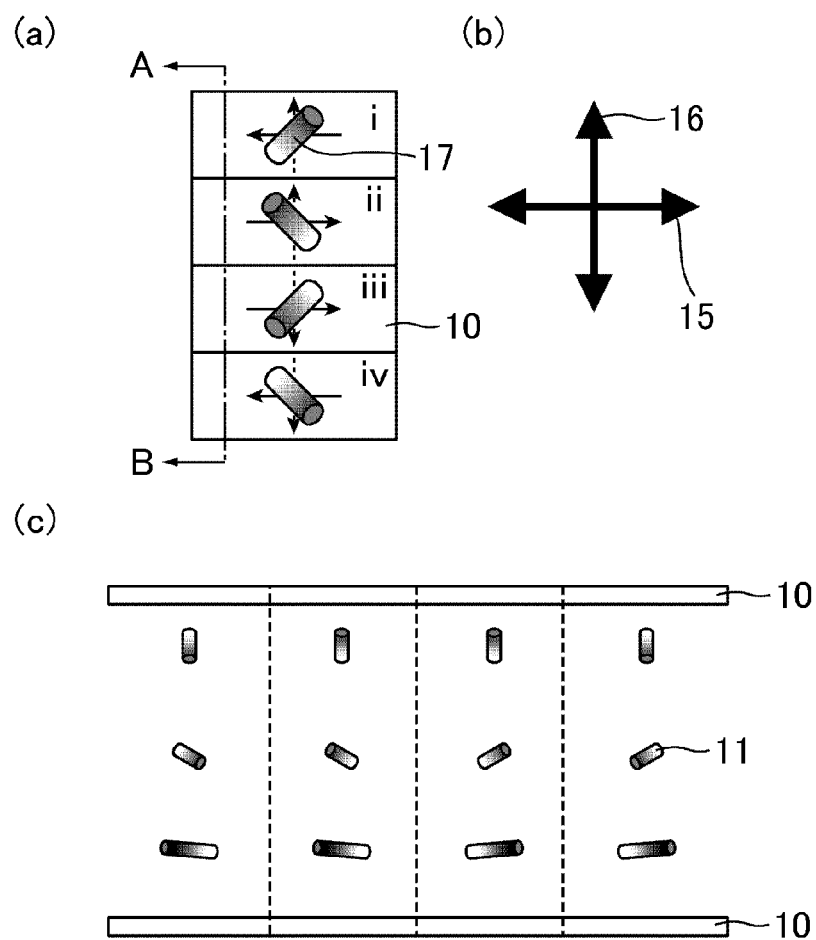
FIG. 11(a) is a schematic plan view illustrating an average liquid crystal director direction in one pixel (or one sub-pixel), photo-alignment treatment directions for a pair of substrates (top and bottom substrates), and the domain division pattern in the case that the liquid crystal display device of the first embodiment has another four-domain structure.
FIG. 11(b) is a schematic view illustrating absorption axis directions of polarizers provided in the liquid crystal display device illustrated in FIG. 11(a)
FIG. 11(c) is a schematic cross-sectional view along the A-B line in FIG. 11(a) when AC voltage not lower than a threshold is applied between the pair of substrates.

The layout of the domains in the liquid crystal display device of the present embodiment is not limited to the four-division pattern illustrated in FIG. 10(a), and may be the pattern illustrated in FIG. 11(a).

In a method for forming such a pattern, the alignment in each pixel (or each sub-pixel) is divided in such a manner so as to halve each pixel (or each sub-pixel) in the substrates at equal pitches as illustrated in FIG. 11(a). The substrates are arranged (attached) in such a manner that the directions of the divided alignment (photo-alignment treatment directions) of the top and bottom substrates 12 are perpendicular to each other, and that the substrate (color filter substrate) is shifted at about ¼ pitch in the dashed line arrow direction in FIG. 11(a). Thereby, the four-domain alignment illustrated in FIG. 11(a) can be provided in which the alignment directions of the liquid crystal molecules are different from (specifically, substantially perpendicular to) each other in the four regions (i to iv in FIG. 11(a)) near the center of the liquid crystal layer in the thickness direction. That is, as illustrated in FIG. 11(a), the average liquid crystal director direction 17 under AC voltage application appears to be along a line that halves an angle formed by the photo-irradiation directions for the respective top and bottom substrates 12 in each domain in a plan view of the substrates.

FIG. 11(b) illustrates that the photo-alignment treatment direction (in FIG. 11(a), dashed line arrows) for the top substrate (color filter substrate) is the same as the absorption axis direction 16 of the polarizer arranged on the top substrate side, and the photo-alignment treatment direction (in FIG. 11(a), solid line arrows) for the bottom substrate (driving element substrate) is the same as the absorption axis direction 15 of the polarizer arranged on the bottom substrate side, in a plan view of the substrates in the present embodiment. Under no voltage application between the top and bottom substrates, the liquid crystal molecules are aligned in a direction substantially perpendicular to the top and bottom substrates by the alignment force of the alignment films. In contrast, application of voltage not lower than a threshold value between the top and bottom substrates twists the liquid crystal molecules 11 about 90° between the top and bottom substrate, and thus four different alignment states exist in the respective four domains, as illustrated in FIG. 11(c).

Hereinafter, the present embodiment will be described in more detail based on examples and comparative examples.

EXAMPLES 16 to 20

In the same manner as in the fourth embodiment, RTN-mode liquid crystal display devices of Examples 16 to 20 were produced which included monomolecular films formed using chlorosilane-based surfactants having different linear alkyl chain lengths. Specifically, in Example 16, a monomolecular film was formed using a chlorosilane-based surfactant with n in the above chemical formula=3. Similarly, monomolecular films were formed using chlorosilane-based surfactants with n=5 in Example 17, n=7 in Example 18, n=9 in Example 19, and n=11 in Example 20.

The pretilt angle, VHR, and residual DC voltage of each of the liquid crystal display devices were measured. The obtained results are shown in Table 4.

COMPARATIVE EXAMPLE 3

No chlorosilane-based surfactant was used. That is, an RTN-mode liquid crystal display device of Comparative Example 3 was produced in the same manner as in Example 16, except that monomolecular films were not formed and the residual carboxyl groups in the alignment film were not treated. The pretilt angle, VHR, and residual DC voltage of the obtained liquid crystal display devices were measured. The obtained results are shown in Table 4.

TABLE 4

|  | Example 16 | Example 17 | Example 18 | Example 19 | Example 20 | Comparative Example 3 |
|---|---|---|---|---|---|---|
| Alkyl chain length (n) | 4 (3) | 6 (5) | 8 (7) | 10 (9) | 12 (11) | N/A |
| Pretilt angle (°) | 87.5 | 87.5 | 88.0 | 88.0 | 89.5 | 87.5 |
| VHR (%) | 99.5 | 99.5 | 99.5 | 99.5 | 99.5 | 99.5 |
| Residual DC voltage (mV) | 100 | 100 | 100 | 100 | 100 | 350 |

Table 4 shows that the VHR in each of Examples 16 to 20 and Comparative Example 3 was 99.5%, which means that no difference was seen between the examples and comparative examples.

In contrast, the residual DC voltage in Comparative Example 3 was 350 mV, whereas the residual DC voltage in each of Examples 16 to 20 was as low as 100 mV. Similarly to the above other examples, the residual DC voltage could be made low while a high VHR was maintained in Examples 16 to 20.

Also, a longer linear alkyl chain led to a pretilt angle closer to 90° in Examples 16 to 20 and Comparative Example 3.

In this way, introduction of the step of treating the alignment film surface with a chlorosilane-based surfactant enabled to achieve a high VHR and low residual DC voltage. This is probably because the carboxyl groups remaining in the polyimide-based alignment film were treated, and thereby the residual DC voltage was reduced while a high VHR was obtained.

Further, in the RTN mode using a photo-reactive alignment film, a longer alkyl chain leads to a pretilt angle closer to 90°. The alkyl chain in the chlorosilane-based surfactant contributes to vertical alignment of the liquid crystals, and a longer chain length is considered to result in higher vertical-alignment ability. Hence, the pretilt angle can be adjusted by adjusting the alkyl chain length.

Fifth Embodiment

Monomolecular films were formed using a chlorosilane-based surfactant represented by the chemical formula $Cl_3Si—(CH_2)_n—CF_3$ was used instead of a chlorosilane-based surfactant represented by the chemical formula $Cl_3Si—(CH_2)_n—CH_3$ in the fourth embodiment. Except for that, an RTN-mode liquid crystal display device was produced in the same manner as in the fourth embodiment.

Hereinafter, the present embodiment will be described in more detail based on examples and comparative examples.

EXAMPLES 21 to 25

In the same manner as in the fifth embodiment, RTN-mode liquid crystal display devices were produced which included monomolecular films formed using chlorosilane-based surfactants having different linear alkyl chain lengths. Specifically, in Example 21, a monomolecular film was formed using a chlorosilane-based surfactant with n in the above chemical formula=3. Similarly, monomolecular films were formed using chlorosilane-based surfactants with n=5 in Example 22, n=7 in Example 23, n=9 in Example 24, and n=11 in Example 25. The pretilt angle, VHR, and residual DC voltage of the obtained liquid crystal display devices were measured in the same manner as in Examples 16 to 20. The obtained results are shown in Table 5 together with the results of Comparative Example 3.

TABLE 5

|  | Example 21 | Example 22 | Example 23 | Example 24 | Example 25 | Comparative Example 3 |
|---|---|---|---|---|---|---|
| Alkyl chain length (n) | 4 (3) | 6 (5) | 8 (7) | 10 (9) | 12 (11) | N/A |
| Pretilt angle (°) | 88.0 | 89.0 | 89.5 | 89.7 | 89.7 | 87.5 |
| VHR (%) | 99.5 | 99.5 | 99.5 | 99.5 | 99.5 | 99.5 |
| Residual DC voltage (mV) | 100 | 80 | 50 | 50 | 50 | 350 |

Table 5 shows that, similarly to Examples 16 to 20, the residual DC voltage in each of Examples 21 to 25 is lower than that in Comparative Example 3 in which no chlorosilane-based surfactant was used, and thus the residual DC voltage was made low while a high VHR was maintained.

The pretilt angle in each of Examples 21 to 25 using a chlorosilane-based surfactant represented by a chemical formula $Cl_3Si—(CH_2)_n—CF_3$ was closer to 90° than the pretilt angles in Examples 16 to 20 using a chlorosilane-based surfactant represented by a chemical formula $Cl_3Si—(CH_2)_n—CH_3$.

In this way, introduction of a fluorine atom in an alkyl chain in the chlorosilane-based surfactant enables to bring the pretilt angle closer to 90 degrees with a shorter alkyl chain length than in Examples 16 to 20 in which no fluorine atom was introduced. Further, fluorine atom introduction contributes to a larger effect of reducing the residual DC voltage.

These results show that fluorine atom introduction into an alkyl chain in a silane-based surfactant makes it possible to effectively control the pretilt angle under low residual DC voltage.

Also, the results of Examples 21 to 25 show that, in terms of further reducing the residual DC voltage, n is preferably an integer of 5 to 11, and more preferably an integer of 7 to 11, in the present embodiment.

Sixth Embodiment

Figure 12:
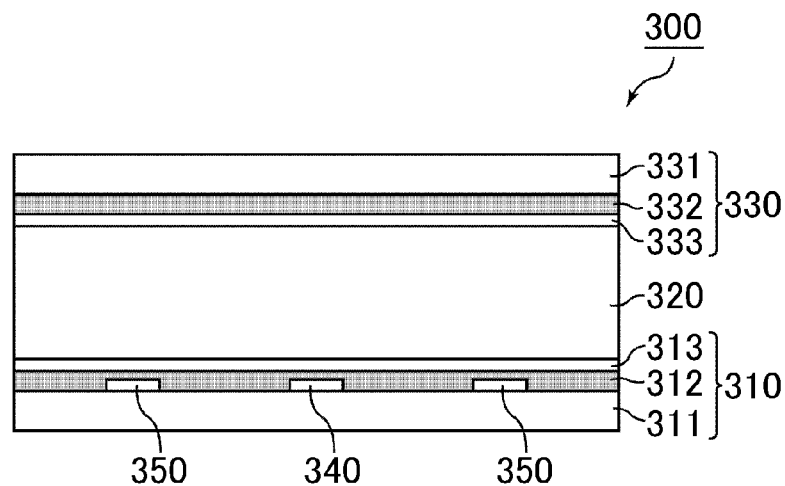
FIG. 12 is a schematic cross-sectional view illustrating the structure of a liquid crystal display device of a sixth embodiment.

The present embodiment will be described based on a liquid crystal display device that employs a lateral electric field system and is in an IPS mode using horizontal alignment films. FIG. 12 is a schematic cross-sectional view of a liquid crystal display device of the present embodiment.

In FIG. 12, a liquid crystal display device 300 is provided with a TFT array substrate 310, a counter substrate 330 disposed to face the TFT array substrate 310, and a liquid crystal layer 320 disposed between the TFT array substrate 310 and the counter substrate 330.

The TFT array substrate 310 has, on the liquid crystal layer 320-side main surface of a glass substrate (supporting substrate 311), multiple gate signal lines parallel to each other, multiple source signal lines perpendicular to the gate signal lines and extending in parallel to each other, and thin film transistors (TFTs) disposed at each crossing portion of a gate signal line and a source signal line, although these components are not illustrated.

The TFT array substrate 310 has comb-like electrodes (pixel electrodes 340, common electrodes 350) for applying lateral electric field to the liquid crystal molecules, and the counter substrate 330 does not have an electrode thereon.

The liquid crystal layer 320 is formed from nematic liquid crystals showing negative dielectric constant anisotropy.

Horizontal alignment films 312 and 332 are formed on the respective liquid crystal layer 320-side surfaces of the TFT array substrate 310 and the counter substrate 330 which have the above structures.

Furthermore, on the alignment films 312 and 332, the monomolecular films 313 and 333 are respectively formed thereon.

The liquid crystal display device 300 having the above structure was produced as described below, for example. First, the substrates 310 and 330 before alignment film formation were produced by a conventionally known method. Then, the following steps are performed.

(4-1. Alignment Film Formation Step)

A liquid crystal alignment agent containing a polyimide produced by imidizing a polyamic acid represented by the above formula (6) was applied to the liquid crystal layer 320-side main surface of each of the TFT array substrate 310 and the counter substrate 330. The polyimide is dissolvable in the state of polyamic acid. The polyimide is imidized by a conventionally known method (e.g., a heating method, a chemical method using a catalyst), and the imidization ratio was adjusted to 50 to 80%. Thereafter, prebaking and postbaking were performed, and thereby horizontal alignment films 312 and 332 for IPS mode were formed.

(4-2. Monomolecular Film Formation Step)

A chlorosilane-based surfactant represented by a chemical formula $Cl_3Si—(CH_2)_n—NH_2$ was dissolved in a solvent containing at least one of water and ethanol, so that a solution was prepared. The solution was heated to 60° C., and the TFT array substrate 310 and the counter substrate 330 were immersed in the solution for 1 hour. Thereby, the monomolecular films 313 and 333 were formed on the alignment films 312 and 332. At this time, the residual carboxyl groups derived from polyamic acid in the alignment films 312 and 332 are bonded to the chlorosilane groups of the chlorosilane-based surfactant by a covalent bond through dehydrochlorination reaction. Thereby, the residual carboxylic acid concentration can be decreased. Therefore, eliminating the residual carboxyl groups while maintaining the imidization ratio at a certain level to avoid an increase in the residual DC voltage enables to achieve a high VHR.

In the monomolecular film formation step, heating the solution makes it possible to promote the reaction between the residual carboxyl groups in the alignment films 312 and 332 and the chlorosilane-based surfactant.

Instead of immersing the substrates 310 and 330 in the solution, the solution may be applied to the substrates 310 and 330.

Thereafter, the substrates 310 and 330 were washed using a solvent containing at least one of water and ethanol. A chlorosilane-based surfactant including a chlorosilane-based surfactant represented by a chemical formula $Cl_3Si—(CH_2)_n—NH_2$ is easily dissolved in a solvent such as water and ethanol. Hence, components of the chlorosilane-based surfactant which have not reacted with the residual carboxyl groups in the monomolecular film formation step can be easily removed by washing with a solvent. Thereby, it is possible to prevent a decrease in the qualities of the liquid crystal display device because of unreacted components of the chlorosilane-based surfactant remaining unreacted.

(4-3. Liquid Crystal Display Device Formation Step)

Subsequently, rubbing treatment was performed on the substrates 310 and 330. A sealant (sealing agent) was applied to one of the substrates, beads were scattered on the other one of the substrates, and the substrates were attached to each other in such a manner that the rubbing directions for the respective substrates would be substantially parallel to each other and point opposite directions (i.e., they are antiparallel) in a plan view of the substrates. The sealant is not particularly limited, and ultraviolet curable resin, heat-curable resin, and the like can be used. Liquid crystals having negative dielectric constant anisotropy were injected between the substrates, and a polarizer was disposed on the surface of each of the supporting substrates 311 and 331 on the opposite side of the liquid crystal layer 320, and thereby the IPS-mode liquid crystal display device 300 including horizontal alignment films was produced.

Hereinafter, the present embodiment will be described in more detail based on examples and comparative examples.

EXAMPLES 26 to 30

In the same manner as in the sixth embodiment, IPS-mode liquid crystal display devices of Examples 26 to 30 were produced which included monomolecular films formed using chlorosilane-based surfactants having different linear alkyl chain lengths. Specifically, in Example 26, a monomolecular film was formed using a chlorosilane-based surfactant with n in the above chemical formula=3. Similarly, monomolecular films were formed using chlorosilane-based surfactants with n=5 in Example 27, n=7 in Example 28, n=9 in Example 29, and n=11 in Example 30. The pretilt angle, VHR, and residual DC voltage of each of the obtained liquid crystal display devices were measured. The obtained results are shown in Table 6.

COMPARATIVE EXAMPLE 4

No chlorosilane-based surfactant was used. That is, an IPS-mode liquid crystal display device of Comparative Example 4 was produced in the same manner as in Example 26, except that monomolecular films were not formed and the residual carboxyl groups in the alignment film were not treated. The pretilt angle, VHR, and residual DC voltage of the obtained liquid crystal display devices were measured. The obtained results are shown in Table 6.

TABLE 6

|  | Example 26 | Example 27 | Example 28 | Example 29 | Example 30 | Comparative Example 4 |
|---|---|---|---|---|---|---|
| Alkyl chain length (n) | 3 (3) | 5 (5) | 7 (7) | 9 (9) | 11 (11) | N/A |
| Pretilt angle (°) | 0.5 | 0.5 | 1.0 | 1.0 | 1.0 | 0.5 |
| VHR (%) | 98.0 | 98.5 | 98.5 | 98.5 | 98.5 | 98.0 |
| Residual DC voltage (mV) | 150 | 100 | 100 | 70 | 50 | 200 |

Table 6 shows that, similarly to the above other examples, both the VHR and residual DC voltage in each of Examples 26 to 30 were better than those in Comparative Example 4 using no chlorosilane-based surfactant, and the residual DC voltage was made low while a high VHR was maintained. Particularly, a longer linear chain structure was observed to lead to a lower value of the residual DC voltage.

Here, a longer linear chain structure was observed to hardly affect the pretilt angle.

In this way, introduction of the step of treating the alignment film surface with a chlorosilane-based surfactant enabled to achieve a high VHR and low residual DC voltage. This is probably because the carboxyl groups remaining in the polyimide-based alignment film were treated, and thereby the residual DC voltage was reduced while a high VHR was obtained.

Also, the increase in the pretilt angle was small even with a longer alkyl chain. This is probably because an amino group was introduced to a terminal.

Also, the results of Examples 26 to 30 show that, in terms of further lowering the residual DC voltage, n is preferably an integer of 5 to 11, and more preferably an integer of 9 to 11, in the present embodiment.

Seventh Embodiment

Figure 7:
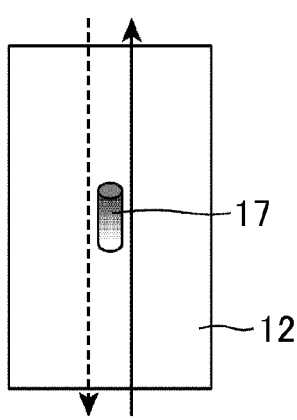
FIG. 7(a) is a schematic plan view illustrating a liquid crystal director direction in one pixel (or one sub-pixel) and photo-alignment treatment directions for a pair of substrates (top and bottom substrates) in the case that the liquid crystal display device of the first embodiment has a mono-domain structure.
FIG. 7(b) is a schematic view illustrating absorption axis directions of polarizers provided in the liquid crystal display device illustrated in FIG. 7(a).
Figure 7:
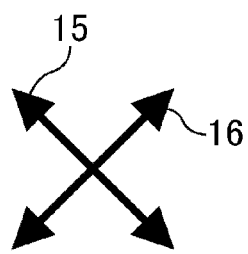

The present embodiment will be described based on an example of a TBA-mode liquid crystal display device that employs a lateral electric field system and have vertical alignment films. FIG. 7 is a schematic cross-sectional view of the liquid crystal display device of the present embodiment.

Figure 13:
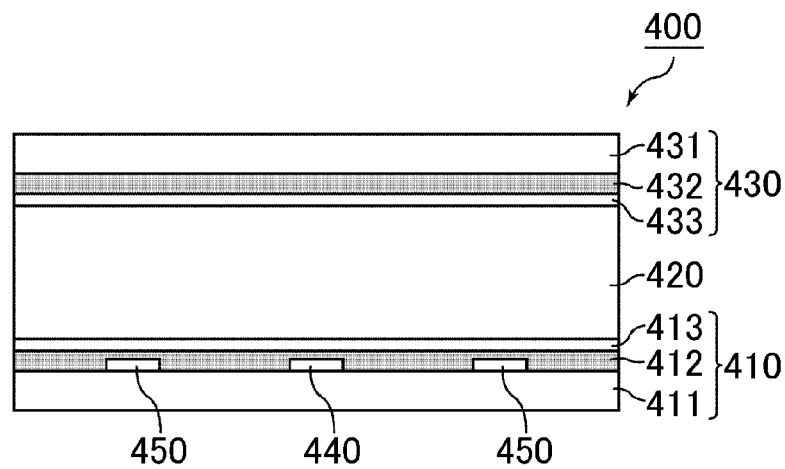
FIG. 13 is a schematic cross-sectional view illustrating the structure of a liquid crystal display device of a seventh embodiment.
Figure 14:
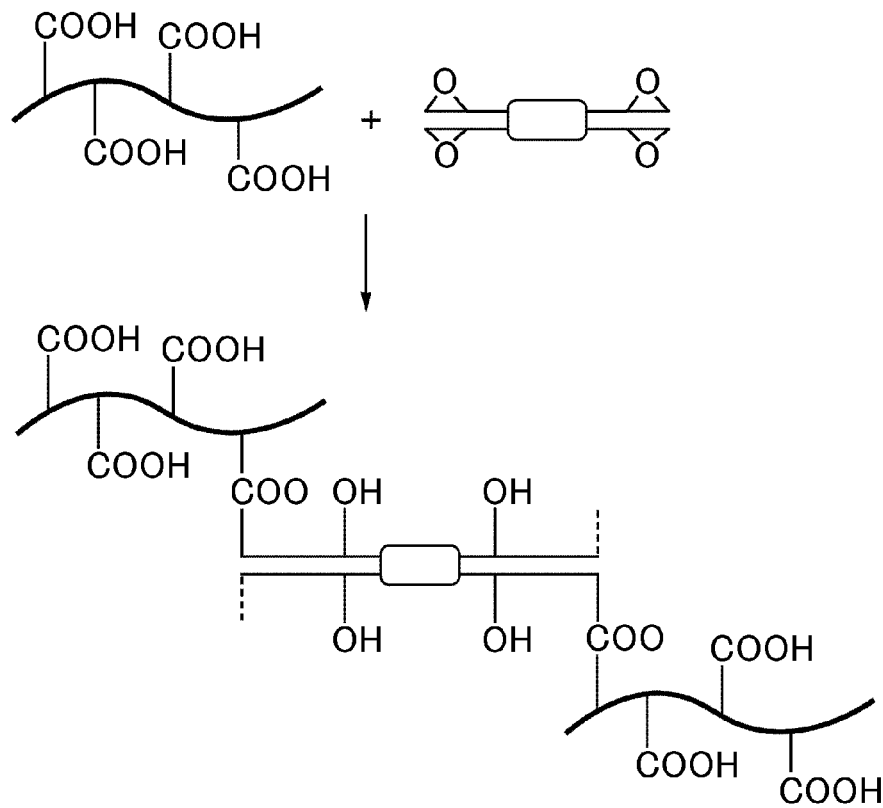
FIG. 14 is a schematic view illustrating a polyimide crosslinked by an epoxy-based additive.
Figure 15:
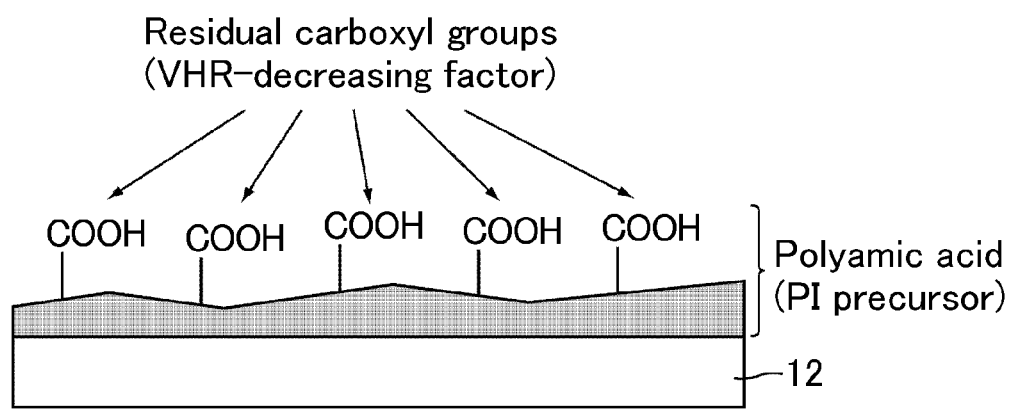
FIG. 15 is a schematic cross-sectional view illustrating a substrate and an alignment film according to a comparative embodiment.

In FIG. 13, a liquid crystal display device 400 is provided with a TFT array substrate 410, a counter substrate 430 disposed to face the TFT array substrate 410, and a liquid crystal layer 420 disposed between the TFT array substrate 410 and the counter substrate 430.

The TFT array substrate 410 has, on the liquid crystal layer 420-side main surface of a glass substrate (supporting substrate 411), multiple gate signal lines parallel to each other, multiple source signal lines perpendicular to the gate signal lines and extending in parallel to each other, and thin film transistors (TFTs) disposed at each crossing portion of a gate signal line and a source signal line, although these components are not illustrated.

The TFT array substrate 410 has comb-like electrodes (pixel electrodes 440, common electrodes 450) for applying lateral electric field to the liquid crystal molecules, and the counter substrate 430 does not have an electrode thereon.

The liquid crystal layer 420 is formed from nematic liquid crystals showing positive dielectric constant anisotropy.

Vertical alignment films 412 and 432 are formed on the respective liquid crystal layer 420-side surfaces of the TFT array substrate 410 and the counter substrate 430 which have the above structures.

Furthermore, on the alignment films 412 and 432, the monomolecular films 413 and 433 are respectively formed thereon.

The liquid crystal display device 400 having the above structure was produced as described below, for example. First, the substrates 410 and 430 before alignment film formation were produced by a conventionally known method. Then, the following steps are performed.

(5-1. Alignment Film Formation Step)

To the liquid crystal layer 420-side main surface of each of the TFT array substrate 410 and the counter substrate 430, a liquid crystal alignment agent was applied which contained a polyimide produced by polymerizing (copolymerizing), by a conventionally known method, at least one of an acid anhydride represented by the above chemical formulas (7) to (13) and at least one of diamine monomers containing vertically aligning functional groups represented by the above chemical formulas (14) to (20). The polyimide is imidized by a conventionally known method (e.g., a heating method, a chemical method using a catalyst), and the imidization ratio was adjusted to 20 to 50%. Thereafter, prebaking and postbaking were performed, and thereby vertical alignment films 412 and 432 were formed.

(5-2. Monomolecular Film Formation Step)

A chlorosilane-based surfactant represented by a chemical formula $Cl_3Si-(CH_2)_n-CH_3$ was dissolved in a solvent containing at least one of water and ethanol, so that a solution was prepared. The solution was heated to 60° C., and the TFT array substrate 410 and the counter substrate 430 were immersed in the solution for 1 hour. Thereby, the monomolecular films 413 and 433 were formed on the alignment films 412 and 432. At this time, as illustrated in FIG. 2, the residual carboxyl groups derived from polyamic acid in the alignment films 412 and 432 are bonded to the chlorosilane groups of the chlorosilane-based surfactant by a covalent bond through dehydrochlorination reaction. Thereby, the residual carboxylic acid concentration can be decreased. Therefore, eliminating the residual carboxyl groups while maintaining the imidization ratio at a certain level to avoid an increase in the residual DC voltage enables to achieve a high VHR.

In the monomolecular film formation step, heating the solution makes it possible to promote the reaction between the residual carboxyl groups in the alignment films 412 and 432 and the chlorosilane-based surfactant.

Instead of immersing the substrates 410 and 430 in the solution, the solution may be applied to the substrates 410 and 430.

Thereafter, the substrates 410 and 430 were washed using a solvent containing at least one of water and ethanol. A chlorosilane-based surfactant containing a linear alkyl group represented by the above formula (2), including a chlorosilane-based surfactant represented by a chemical formula $Cl_3Si-(CH_2)_n-CH_3$, is easily dissolved in a solvent such as water and ethanol. Hence, components of the chlorosilane-based surfactant which have not reacted with the residual carboxyl groups in the monomolecular film formation step can be easily removed by washing with a solvent. Thereby, it is possible to prevent a decrease in the qualities of the liquid crystal display device because of the unreacted components of the chlorosilane-based surfactant.

(5-3. Liquid Crystal Display Device Formation Step)

A sealant (sealing agent) was applied to one of the substrates, beads were scattered on the other of the substrates, and the substrates were attached to each other. The sealant is not particularly limited, and ultraviolet curable resin, thermosetting resin, and the like can be used. Liquid crystals having positive dielectric constant anisotropy were injected between the substrates, and a polarizer was disposed on the surface of each of the supporting substrates 411 and 431 on the opposite side of the liquid crystal layer 420, and thereby the TBA-mode liquid crystal display device 400 including vertical alignment films was produced.

Hereinafter, the present embodiment will be described in more detail based on examples and comparative examples.

EXAMPLES 31 to 35

In the same manner as in the seventh embodiment, TBA-mode liquid crystal display devices of Examples 31 to 35 were produced which included monomolecular films formed using chlorosilane-based surfactants having different linear alkyl chain lengths. Specifically, in Example 31, a monomolecular film was formed using a chlorosilane-based surfactant with n in the above chemical formula=3. Similarly, monomolecular films were formed using chlorosilane-based surfactants with n=5 in Example 32, n=7 in Example 33, n=9 in Example 34, and n=11 in Example 35. The pretilt angle, VHR, and residual DC voltage of the obtained liquid crystal display devices were measured. The obtained results are shown in Table 7.

COMPARATIVE EXAMPLE 5

No chlorosilane-based surfactant was used. That is, a TBA-mode liquid crystal display device of Comparative Example 5 was produced in the same manner as in Example 31, except that monomolecular films were not formed and the residual carboxyl groups in the alignment film were not treated. The pretilt angle, VHR, and residual DC voltage of the obtained liquid crystal display devices were measured. The obtained results are shown in Table 7.

TABLE 7

|  | Example 31 | Example 32 | Example 33 | Example 34 | Example 35 | Comparative Example 5 |
|---|---|---|---|---|---|---|
| Alkyl chain length (n) | 4 (3) | 6 (5) | 8 (7) | 10 (9) | 12 (11) | N/A |
| Pretilt angle (°) | 90 | 90 | 90 | 90 | 90 | 90 |
| VHR (%) | 98.5 | 98.5 | 98.5 | 98.5 | 98.5 | 98.0 |
| Residual DC voltage (mV) | 150 | 150 | 150 | 150 | 150 | 300 |

Table 7 shows that, similarly to the above other examples, the VHR and residual DC voltage in each of Examples 31 to 35 were better than those in Comparative Example 5 using no chlorosilane-based surfactant, and the residual DC voltage was made low while a high VHR was maintained.

The pretilt angle in each of Examples 31 to 35 and Comparative Example 5 was 90°. That is, the linear alkyl chain in the chlorosilane-based surfactant did not affect the alignment of the liquid crystal molecules in the present embodiment in which the liquid crystal molecules were vertically aligned.

In this way, introduction of the step of treating the alignment film surface with a chlorosilane-based surfactant enabled to achieve a high VHR and low residual DC voltage. This is probably because the carboxyl groups remaining in the polyimide-based alignment film were treated, and thereby the residual DC voltage was reduced while a high VHR was obtained.

Also, since vertical alignment films were used, the linear alkyl chain did not affect the aligning ability.

The present application claims priority to Patent Application No. 2010-066894 filed in Japan on Mar. 23, 2010 under the Paris Convention and provisions of national law in a designated State, the entire contents of which are hereby incorporated by reference.

EXPLANATION OF SYMBOLS

11: Liquid crystal molecule
10, 12: Substrate (top and bottom substrates)
13: Photomask
14: Light shielding portion
15: Absorption axis direction of polarizer arranged on bottom substrate side
16: Absorption axis direction of polarizer arranged on top substrate side
17: Average director direction under AC voltage application
100, 200, 250, 300, 400: Liquid crystal display device
110, 210, 260, 310, 410: TFT array substrate
111, 131, 211, 231, 261, 281, 311, 331, 411, 431: Supporting substrate
20, 112, 132, 212, 232, 262, 282, 312, 332, 412, 432: Alignment film
113, 133, 213, 233, 263, 283, 313, 333, 413, 433: Monomolecular film
115, 215, 265, 340, 440: Pixel electrode
120, 220, 270, 320, 420: Liquid crystal layer
130, 230, 280, 330, 430: Counter substrate
135, 235, 285, 350, 450: Counter electrode (common electrode)
214: Slit
234: Projection

The invention claimed is:

1. A liquid crystal display device comprising:
   a pair of substrates;
   a liquid crystal layer that contains liquid crystal molecules and is disposed between the pair of substrates;
   an alignment film between the liquid crystal layer and at least one of the pair of substrates, the alignment film containing a polyamic acid or a polyimide with an imidization ratio of less than 100%, and
   a monomolecular film between the liquid crystal layer and the alignment film,
   wherein the polyamic acid or the polyimide of the alignment film includes a photo-reactive functional group,
   wherein the monomolecular film includes a structure that is derived from a silane-based surfactant that contains the following chemical formula (1) or (3):

$$Cl_3Si\text{—}(CR^1{}_2)_n\text{—}CR^2{}_3 \quad (1),$$

or $$Cl_3Si\text{—}(CR^1{}_2)_n\text{—}NH_2 \quad (3),$$

wherein each $R^1$ is the same as or different from each other, wherein each $R^1$ represents a hydrogen atom or a halogen atom,
   wherein each $R^2$ is the same as or different from each other, wherein each $R^2$ represents a hydrogen atom or a halogen atom, and wherein n represents an integer of 3 to 17,
   wherein the monomolecular film is a single layer formed of a same material that covers and is in contact with the entire surface of the alignment film so that the silane-based surfactant included in the monomolecular film reacts with carboxyl groups in the alignment film, to form a covalent bond that is between a structure derived from a carboxyl group in the alignment film and silicon in a structure derived from the silane-based surfactant, and is represented by the following chemical formula (2):

$$\text{—COO—Si—}, \quad (2)$$

thereby lowering the concentration of residual carboxyl groups contained in the alignment film without changing the imidization ratio, and
   wherein a pretilt angle of the liquid crystal molecules satisfies at least one of $0°<\theta\leq8°$ and $81°<\theta\leq90°$ due to the alignment film having undergone a photo-alignment treatment after forming the monomolecular film, which results in minimal changes in aligning ability of the alignment film.

2. The liquid crystal display device according to claim 1, wherein the silane-based surfactant contains a group represented by the following formula (3):

$$\text{—}(CH_2)_n\text{—}NH_2 \quad (3)$$

wherein n represents an integer of 3 to 17.

3. The liquid crystal display device according to claim 1, wherein a pretilt angle $\theta$ of the liquid crystal molecules satisfies $0°<\theta\leq8°$.

4. The liquid crystal display device according to claim 1, wherein the polyamic acid or the polyimide of the alignment film includes a first monomer unit and a second monomer unit, the first monomer unit having a side chain with the photo-reactive functional group, and the second monomer unit having a side chain without the photo-reactive functional group.

5. The liquid crystal display device according to claim 1, wherein the silane-based surfactant contains a linear alkyl group represented by the following formula (4):

$$\text{—}(CH_2)_n\text{—}CH_3 \quad (4),$$

wherein n represents an integer of 3 to 11.

6. The liquid crystal display device according to claim 1, wherein at least one of $R^1$ and $R^2$ in formula (1) is a fluorine atom.

7. The liquid crystal display device according to claim 1, wherein the silane-based surfactant contains a linear alky group represented by the following formula (5):

$$—(CH_2)_n—CF_3 \tag{5}$$

wherein n represents an integer of 3 to 17.

8. The liquid crystal display device according to claim 1, wherein the silane-based surfactant contains a linear alkyl group represented by the following formula (6):

$$—(CH_2)_{n-1}—CF_2CF_3 \tag{6}$$

wherein n represents an integer of 3 to 17.

9. The liquid crystal display device according to claim 1, wherein the imidization ratio is in the range of 20 to 80% to minimize DC image sticking effects by reducing a residual DC voltage, and the silane-based surfactant included in the monomolecular film is adsorbed on carboxyl groups in the alignment film to improve a voltage holding ratio (VHR) by lowering the concentration of residual carboxyl groups contained in the alignment film when compared to a liquid crystal display device without said monomolecular film.

10. A liquid crystal display device comprising:
a pair of substrates;
a liquid crystal layer between the pair of substrates, the liquid crystal layer containing liquid crystal molecules;
an alignment film between the liquid crystal layer and at least one of the pair of substrates, the alignment film containing a polyamic acid or a polyimide with an imidization ratio in the range of 20 to 80%, which results in reduced residual DC voltage; and
a monomolecular film between the liquid crystal layer and the alignment film,
wherein the polyamic acid or the polyimide of the alignment film includes a photoreactive functional group,
wherein the monomolecular film includes a structure that is derived from a silane-based surfactant that contains the following chemical formula (1) or (3):

$$Cl_3Si—(CR^1{}_2)_n—CR^2{}_3 \tag{1},$$

or $$Cl_3Si—(CR^1{}_2)_n—NH_2 \tag{3},$$

wherein each $R^1$ is the same as or different from each other, wherein each $R^1$ represents a hydrogen atom or a halogen atom,
wherein each $R^2$ is the same as or different from each other, wherein each $R^2$ represents a hydrogen atom or a halogen atom, and wherein n represents an integer of 3 to 17,
wherein the monomolecular film is a single layer formed of a same material that covers and is in contact with the entire surface of the alignment film so that the silane-based surfactant included in the monomolecular film reacts with carboxyl groups in the alignment film to form a covalent bond that is between a structure derived from a carboxyl group in the alignment film and silicon in a structure derived from the silane-based surfactant, and is represented by the following chemical formula (2):

$$—COO—\overset{|}{\underset{|}{Si}}— , \tag{2}$$

wherein a pretilt angle of the liquid crystal molecules satisfies at least one of 0°<θ≤8° and 81°<θ≤90° due to the alignment film having undergone a photo-alignment treatment after forming the monomolecular film, which results in minimal changes in aligning ability of the alignment film,
wherein the silane-based surfactant included in the monomolecular film is configured to be adsorbed on carboxyl groups in the alignment film to thus lower the concentration of residual carboxyl groups contained in the alignment film, which results in improved voltage holding ratio (VHR), and
wherein the residual DC voltage is less than or equal to 150 mV, and the VHR is more than or equal to 98.0%.

11. The liquid crystal display device according to claim 10, wherein the liquid crystal display device is capable of operating under one of TN mode and IPS mode, the imidization ratio of the alignment film is in the range of 50 to 80%, and a pretilt angle θ of the liquid crystal molecules satisfies 0°<θ≤8° due to the alignment film having undergone a photo-alignment treatment after forming the monomolecular film, which results in minimal changes in aligning ability of the alignment film.

12. The liquid crystal display device according to claim 11, wherein the silane-based surfactant comprises a chlorosilane-based surfactant that contains the following chemical formula (7) or (8):

$$Cl_3—Si—(CH_2)_n—CH_3 \tag{7}$$

$$Cl_3—Si—(CH_2)_n—NH_2 \tag{8}$$

wherein n represents an integer of 3 to 11.

13. The liquid crystal display device according to claim 10, wherein the liquid crystal display device is capable of operating under one of VA mode, RTN mode and TBA mode, the imidization ratio of the alignment film is in the range of 20 to 50%, and a pretilt angle θ of the liquid crystal molecules satisfies 81°<θ≤90° due to the alignment film having undergone a photo-alignment treatment after forming the monomolecular film, which results in minimal changes in aligning ability of the alignment film.

14. The liquid crystal display device according to claim 13, wherein the silane-based surfactant comprises a chlorosilane-based surfactant that contains the following chemical formula (7) or (9):

$$Cl_3—Si—(CH_2)_n—CH_3 \tag{7}$$

$$Cl_3—Si—(CH_2)_n—CF_3 \tag{9}$$

wherein n represents an integer of 3 to 11.

* * * * *